United States Patent
Yamashita

(10) Patent No.: US 10,917,542 B2
(45) Date of Patent: Feb. 9, 2021

(54) COLOR CONVERSION INFORMATION GENERATION METHOD, NON-TRANSITORY COMPUTER-READABLE STORAGE MEDIUM STORING COLOR CONVERSION INFORMATION GENERATION PROGRAM, AND COLOR CONVERSION INFORMATION GENERATION APPARATUS

(71) Applicant: SEIKO EPSON CORPORATION, Tokyo (JP)

(72) Inventor: Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/833,710

(22) Filed: Mar. 30, 2020

(65) Prior Publication Data

US 2020/0314292 A1 Oct. 1, 2020

(30) Foreign Application Priority Data

Apr. 1, 2019 (JP) .................................. 2019-069670

(51) Int. Cl.
*H04N 1/60* (2006.01)
*G01J 3/50* (2006.01)

(52) U.S. Cl.
CPC ............ *H04N 1/6052* (2013.01); *G01J 3/506* (2013.01); *H04N 1/6022* (2013.01)

(58) Field of Classification Search
None
See application file for complete search history.

(56) References Cited

U.S. PATENT DOCUMENTS 8,072,658 B2 * 12/2011 Namikata ............. G06T 11/001
358/518
10,356,281 B2 * 7/2019 Yamashita ........... H04N 1/6019
(Continued)

FOREIGN PATENT DOCUMENTS

JP 2006-157294 A 6/2006

*Primary Examiner* — Dung D Tran
(74) *Attorney, Agent, or Firm* — Global IP Counselors, LLP

(57) ABSTRACT

A color conversion information generation apparatus converts a first coordinate value into a second coordinate value in a second color space by using first conversion information, acquires a colorimetric coordinate value in a first color space indicating a colorimetric result of an image output by a first output apparatus according to the second coordinate value, converts the second coordinate value into a third coordinate value by using second conversion information, determines a target coordinate value indicating a target color in the first color space based on the third coordinate value and a difference between the first coordinate value and the colorimetric coordinate value, retrieves a fourth coordinate value satisfying a condition that a color difference between a fifth coordinate value in the first color space obtained by converting a fourth coordinate value in the second color space by using the second conversion information and the target coordinate value is smaller than a color difference between the third coordinate value and the target coordinate value, and generates color conversion information used to convert the first coordinate value or a name of a color into a coordinate value in the second color space based on the first coordinate value and the fourth coordinate value satisfying the condition.

7 Claims, 21 Drawing Sheets

(56) References Cited

U.S. PATENT DOCUMENTS

| | | | |
|---|---|---|---|
| 10,455,122 B2* | 10/2019 | Yamashita | G01J 3/463 |
| 2006/0007457 A1* | 1/2006 | Namikata | H04N 1/6033 |
| | | | 358/1.9 |
| 2017/0251128 A1* | 8/2017 | Horita | H04N 1/6033 |
| 2018/0152603 A1* | 5/2018 | Seko | H04N 1/6058 |

* cited by examiner

| C | M | Y | K | L | a | b |
|---|---|---|---|---|---|---|
| $C_1$ | $M_1$ | $Y_1$ | $K_1$ | $L_1$ | $a_1$ | $b_1$ |
| ... | ... | ... | ... | ... | ... | ... |
| $C_{N1}$ | $M_{N1}$ | $Y_{N1}$ | $K_{N1}$ | $L_{N1}$ | $a_{N1}$ | $b_{N1}$ |

| L | a | b | c | m | y | k |
|---|---|---|---|---|---|---|
| $L_1$ | $a_1$ | $b_1$ | $c_1$ | $m_1$ | $y_1$ | $k_1$ |
| ... | ... | ... | ... | ... | ... | ... |
| $L_{N2}$ | $a_{N2}$ | $b_{N2}$ | $c_{N2}$ | $m_{N2}$ | $y_{N2}$ | $k_{N2}$ |

| c | m | y | k | L | a | b |
|---|---|---|---|---|---|---|
| $c_1$ | $m_1$ | $y_1$ | $k_1$ | $L_1$ | $a_1$ | $b_1$ |
| ... | ... | ... | ... | ... | ... | ... |
| $c_{N3}$ | $m_{N3}$ | $y_{N3}$ | $k_{N3}$ | $L_{N3}$ | $a_{N3}$ | $b_{N3}$ |

| L | a | b | c | m | y | k |
|---|---|---|---|---|---|---|
| $L_1$ | $a_1$ | $b_1$ | $c_1$ | $m_1$ | $y_1$ | $k_1$ |
| ... | ... | ... | ... | ... | ... | ... |
| $L_{N4}$ | $a_{N4}$ | $b_{N4}$ | $c_{N4}$ | $m_{N4}$ | $y_{N4}$ | $k_{N4}$ |

| c0 | m0 | y0 | k0 | c1 | m1 | y1 | k1 |
|---|---|---|---|---|---|---|---|
| $c0_1$ | $m0_1$ | $y0_1$ | $k0_1$ | $c1_1$ | $m1_1$ | $y1_1$ | $k1_1$ |
| ... | ... | ... | ... | ... | ... | ... | ... |
| $c0_i$ | $m0_i$ | $y0_i$ | $k0_i$ | $c1_i$ | $m1_i$ | $y1_i$ | $k1_i$ |
| ... | ... | ... | ... | ... | ... | ... | ... |
| $c0_{N5}$ | $m0_{N5}$ | $y0_{N5}$ | $k0_{N5}$ | $c1_{N5}$ | $m1_{N5}$ | $y1_{N5}$ | $k1_{N5}$ | cmyk0        cmyk1

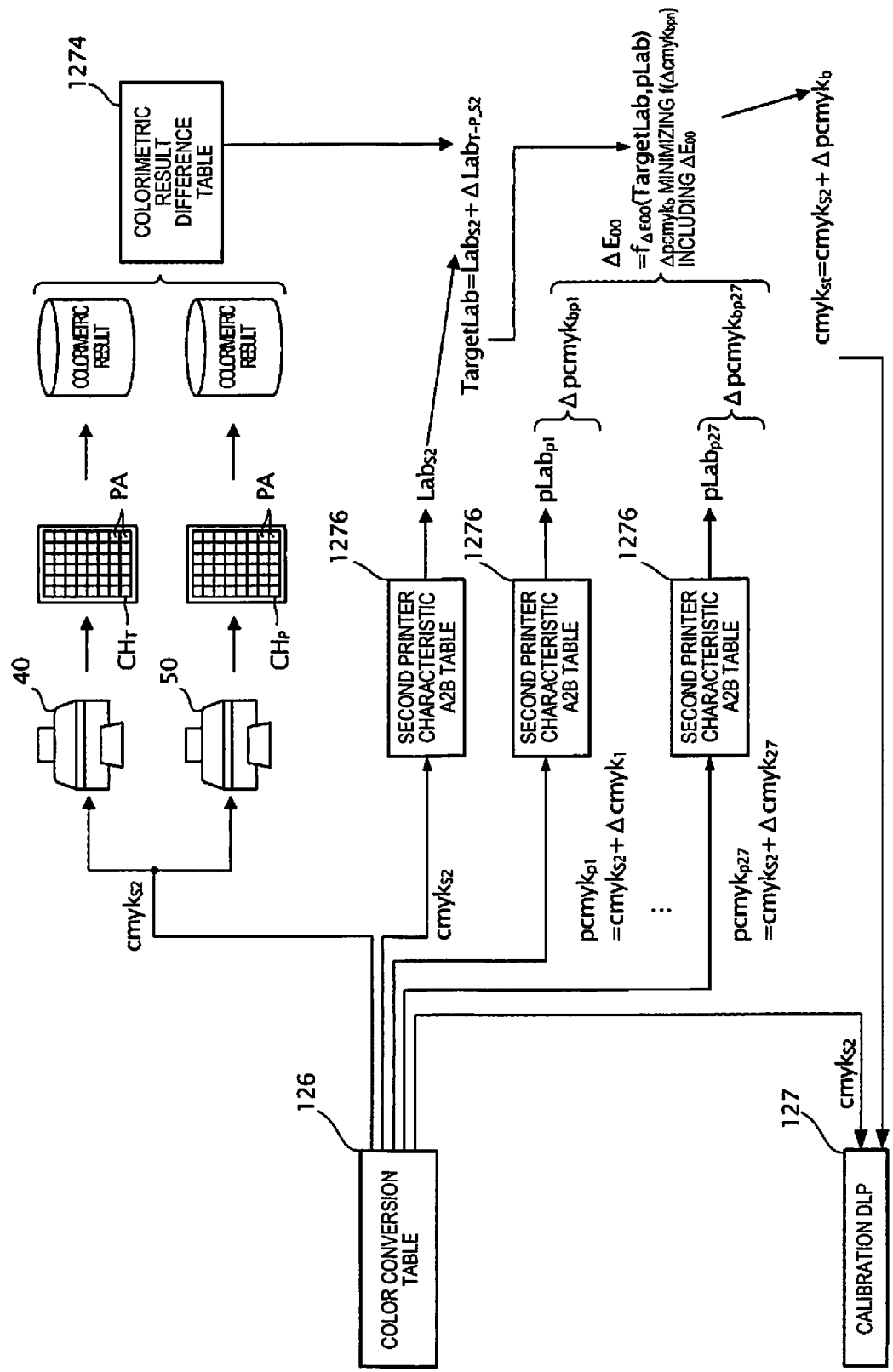

| c | m | y | k | L | a | b |
|---|---|---|---|---|---|---|
| $c_1$ | $m_1$ | $y_1$ | $k_1$ | $L_1$ | $a_1$ | $b_1$ |
| ... | ... | ... | ... | ... | ... | ... |
| $c_{N6}$ | $m_{N6}$ | $y_N$ | $k_{N6}$ | $L_{N6}$ | $a_{N6}$ | $b_{N6}$ |

$\underbrace{\qquad\qquad\qquad}_{ccmyk}$  $\underbrace{\qquad\qquad}_{cLab_{ECI\_P}}$

| L | a | b | ΔL | Δa | Δb |
|---|---|---|---|---|---|
| $L_1$ | $a_1$ | $b_1$ | $(\Delta L_{T-P})_1$ | $(\Delta a_{T-P})_1$ | $(\Delta b_{T-P})_1$ |
| ... | ... | ... | ... | ... | ... |
| $L_i$ | $a_i$ | $b_j$ | $(\Delta L_{T-P})_j$ | $(\Delta a_{T-P})_j$ | $(\Delta b_{T-P})_j$ |
| ... | ... | ... | ... | ... | ... |
| $L_{N7}$ | $a_{N7}$ | $b_{N7}$ | $(\Delta L_{T-P})_{N7}$ | $(\Delta a_{T-P})_{N7}$ | $(\Delta b_{T-P})_{N7}$ |

$\underbrace{\qquad\qquad}_{cLab_P}$  $\underbrace{\qquad\qquad\qquad}_{\Delta cLab_{T-P}}$

COLOR CONVERSION INFORMATION GENERATION METHOD, NON-TRANSITORY COMPUTER-READABLE STORAGE MEDIUM STORING COLOR CONVERSION INFORMATION GENERATION PROGRAM, AND COLOR CONVERSION INFORMATION GENERATION APPARATUS

The present application is based on, and claims priority from JP Application Serial Number 2019-069670, filed Apr. 1, 2019, the disclosure of which is hereby incorporated by reference herein in its entirety.

BACKGROUND

1. Technical Field

The present disclosure relates to a color conversion information generation method, a non-transitory computer-readable storage medium storing a color conversion information generation program, and a color conversion information generation apparatus.

2. Related Art

In the related art, there is a technique of executing printing by taking into consideration characteristics of a printer. For example, JP-A-2006-157294 discloses a technique in which a coordinate value in a space representing any color is converted into a coordinate value in a space representing a color that can be output by a printer, and thus printing is executed by taking into consideration characteristics of the printer. Hereinafter, for convenience of description, a space representing any color will be referred to as an "apparatus-independent color space", a color defined as a coordinate value in the apparatus-independent color space will be referred to as an "apparatus-independent color", a space representing a color that can be output by a printer will be referred to as an "apparatus-dependent color space", a color defined as a coordinate value in the apparatus-dependent color space will be referred to as an "apparatus-dependent color", and information for converting an apparatus-independent color into an apparatus-dependent color will be referred to as "conversion information".

However, in the related art, when an apparatus-independent color is printed by a printer, correction information for correcting conversion information is generated to accurately convert an apparatus-independent color from a coordinate value in an apparatus-independent color space into a coordinate value in an apparatus-dependent color space, and the coordinate value in the apparatus-dependent color space that is obtained from the conversion information based on the apparatus-independent color is corrected by using the correction information. Thus, in the related art, when an output command for outputting the apparatus-independent color is supplied to an output apparatus, a process of correcting a coordinate value in an apparatus-dependent color space obtained from conversion information based on a coordinate value indicating the apparatus-independent color is required to be performed by using correction information every time, and thus there is a problem in that the time required for a process of outputting the apparatus-independent color is increased.

SUMMARY

A color conversion information generation method according to an aspect of the present disclosure is a color conversion information generation method of causing a computer to execute a reception step of receiving one or both of a first coordinate value in a first color space for defining a color and a name indicating a color defined as the first coordinate value; a first conversion step of converting the first coordinate value into a second coordinate value in a second color space by using first conversion information for converting a coordinate value in the first color space into a coordinate value in the second color space; an acquisition step of acquiring a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space; a second conversion step of converting the second coordinate value into a third coordinate value in the first color space by using second conversion information for converting a coordinate value in the second color space into a coordinate value in the first color space; a determination step of determining a target coordinate value in the first color space based on a color difference between the first coordinate value and the colorimetric coordinate value, and the third coordinate value; a retrieval step of retrieving a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and a generation step of generating color conversion information for converting the first coordinate value or the name into a coordinate value in the second color space based on the first coordinate value and the fourth coordinate value.

A non-transitory computer-readable storage medium according to another aspect of the present disclosure is a non-transitory computer-readable storage medium storing a program, the program causing a computer to function as a reception portion that receives one or both of a first coordinate value in a first color space for defining a color and a name indicating a color defined as the first coordinate value; a first conversion portion that converts the first coordinate value into a second coordinate value in a second color space by using first conversion information for converting a coordinate value in the first color space into a coordinate value in the second color space; an acquisition portion that acquires a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space; a second conversion portion that converts the second coordinate value into a third coordinate value in the first color space by using second conversion information for converting a coordinate value in the second color space into a coordinate value in the first color space; a determination portion that determines a target coordinate value in the first color space based on a color difference between the first coordinate value and the colorimetric coordinate value, and the third coordinate value; a retrieval portion that retrieves a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and a generation portion that generates color conversion information for converting the first coordinate value or the name into a coordinate value in the second color space based on the first coordinate value and the fourth coordinate value.

A color conversion information generation apparatus according to still another aspect of the present disclosure is a color conversion information generation apparatus including: a reception portion that receives one or both of a first coordinate value in a first color space for defining a color and a name indicating a color defined as the first coordinate value; a first conversion portion that converts the first coordinate value into a second coordinate value in a second color space by using first conversion information for converting a coordinate value in the first color space into a coordinate value in the second color space; an acquisition portion that acquires a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space; a second conversion portion that converts the second coordinate value into a third coordinate value in the first color space by using second conversion information for converting a coordinate value in the second color space into a coordinate value in the first color space; a determination portion that determines a target coordinate value in the first color space based on a color difference between the first coordinate value and the calorimetric coordinate value, and the third coordinate value; a retrieval portion that retrieves a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and a generation portion that generates color conversion information for converting the first coordinate value or the name into a coordinate value in the second color space based on the first coordinate value and the fourth coordinate value.

BRIEF DESCRIPTION OF THE DRAWINGS

FIG. 22 is a diagram illustrating a calibration DLP.
FIG. 23 is a diagram illustrating an outline of generation of the calibration DLP.
FIG. 24 is a diagram illustrating a second printer characteristic A2B table.
FIG. 25 is a diagram illustrating a colorimetric result difference table.

DESCRIPTION OF EXEMPLARY EMBODIMENTS

Hereinafter, embodiments of the present disclosure will be described with reference to the drawings. However, in each drawing, a dimension and a scale of each unit are different from actual ones as appropriate. The embodiments described below are preferred specific examples of the present disclosure, and are thus added with various technically preferable limitations, but the scope of the present disclosure is not limited to such forms unless there is a disclosure of particularly limiting the present disclosure.

A. First Embodiment

First, a description will be made of a color conversion table generation system 1 according to a first embodiment.

A.1. Outline of Color Conversion Table Generation System 1

Figure 1:
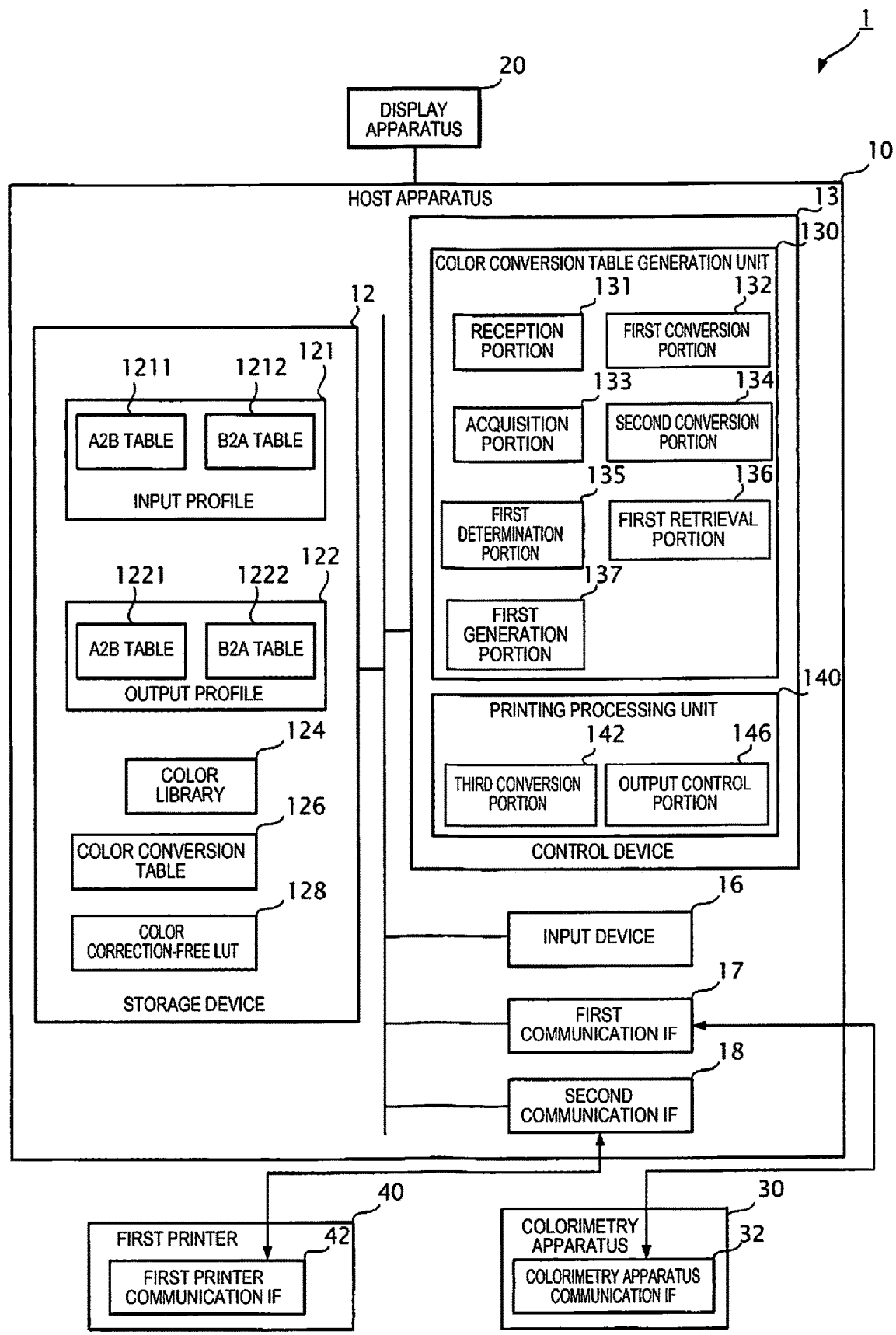
FIG. 1 is a diagram illustrating a configuration of a color conversion table generation system.

FIG. 1 is a diagram illustrating a configuration of the color conversion table generation system 1. The color conversion table generation system 1 includes a host apparatus 10, a display apparatus 20, a colorimetry apparatus 30, and a first printer 40. The host apparatus 10 is an example of a "color conversion information generation apparatus". The first printer 40 is an example of a "first output apparatus". The host apparatus 10 may access the display apparatus 20, the colorimetry apparatus 30, and the first printer 40.

The host apparatus 10 is a computer that controls the display apparatus 20, the colorimetry apparatus 30, and the first printer 40 and thus generates a color conversion table 126.

The display apparatus 20 displays various images under the control of the host apparatus 10. For example, various display panels such as a liquid crystal display panel or an organic EL display panel are preferably used as the display apparatus 20. EL stands for electroluminescence.

The first printer 40 is an ink jet printer that forms an image on a medium by ejecting ink in response to an instruction from the host apparatus 10. The medium is recording paper such as plain paper, a picture, or a postcard. Colors of the ink are a total of four colors such as cyan, magenta, yellow, and black. The ink is not limited to the four colors. For example, the first printer 40 may use ink with colors such as light cyan, light magenta, dark yellow, or light black. The first printer 40 of the first embodiment uses ink with four colors such as cyan, magenta, yellow, and black.

The colorimetry apparatus 30 performs colorimetry on an image that is displayed on a medium by the first printer 40, and outputs a colorimetric value that is a value of a measured color. The colorimetry apparatus 30 outputs a colorimetric value in an apparatus-independent color space. The apparatus-independent color space is an example of a "first color space".

Figures 7, 8:
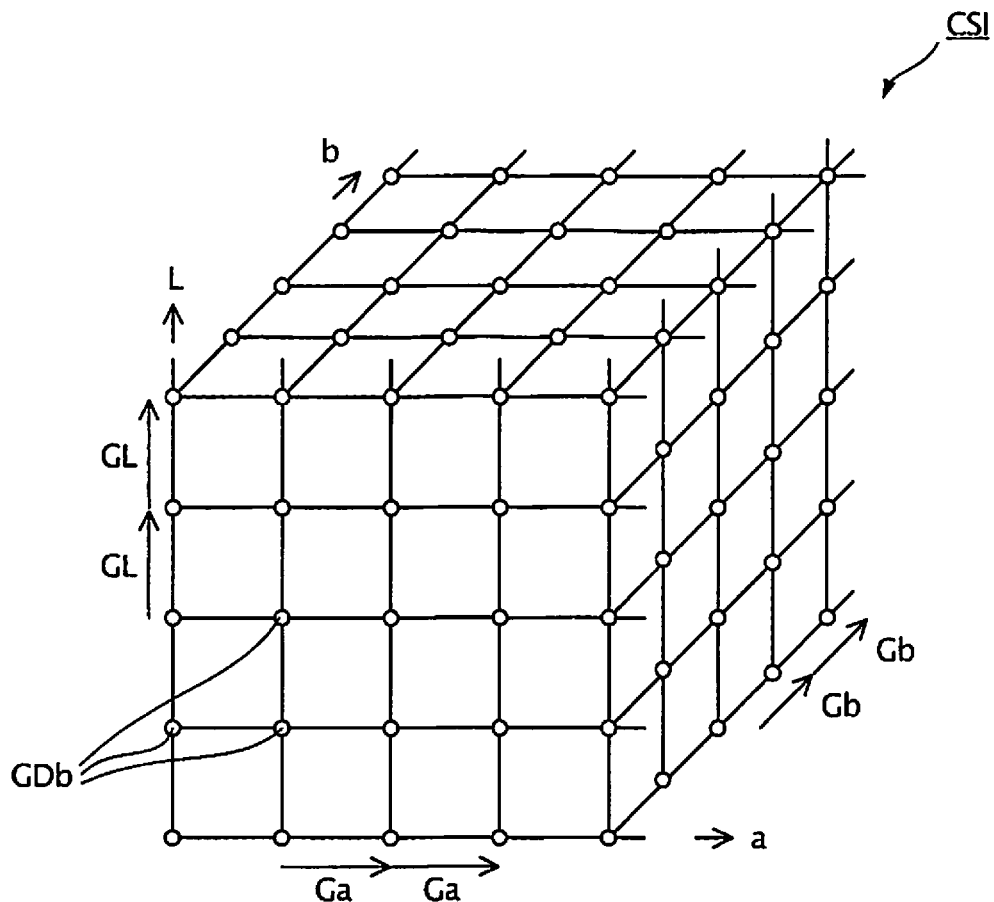
FIG. 7 is a diagram illustrating an Lab color space.
FIG. 8 is a diagram illustrating a color conversion table.

The apparatus-independent color space is, for example, a CIE L*a*b* color space or a CIE XYZ color space. CIE stands for Commission internationale de l'eclairage. In the following description, the apparatus-independent color space is the CIE L*a*b* color space, and the CIE L*a*b* color space will be simply referred to as an Lab color space CSI as illustrated in FIG. 7. Similarly, a coordinate value in the Lab color space CSI will be referred to as an "Lab value".

An input device 16 is a device used for a user to input information. The input device 16 is formed of one or more types of devices such as a pointing device, a keyboard, and a touch panel bonded to a surface of the display apparatus 20.

A first communication IF 17 is a device performing communication with a colorimetry apparatus communication IF 32 of the colorimetry apparatus 30. A second communication IF 18 is a device performing communication with a first printer communication IF 42 of the first printer 40. Each of the first communication IF 17, the second communication IF 18, the colorimetry apparatus communication IF 32, and the first printer communication IF 42 will also be referred to as, for example, a network device, a network controller, a network card, or a communication module. As a standard for the first communication IF 17, the second communication IF 18, the colorimetry apparatus communication IF 32, and the first printer communication IF 42, for example, the USB or a short-range radio communication standard may be used. USB stands for Universal Serial Bus. Communication in the first communication IF 17, the second communication IF 18, the colorimetry apparatus communication IF 32, and the first printer communication IF 42 may be wired communication, may be wireless communication, and network communication using a LAN or the Internet. LAN stands for a local area network.

The host apparatus 10 includes a storage device 12, a control device 13, the input device 16, the first communication IF 17, and the second communication IF 18. IF stands for an interface. The colorimetry apparatus 30 includes the colorimetry apparatus communication IF 32. The first printer 40 includes the first printer communication IF 42.

The storage device 12 is a recording medium that is readable by the control device 13, and stores a plurality of programs, various pieces of data used by the control device 13, an input profile 121, an output profile 122, a color library 124, the color conversion table 126, and a color correction-free LUT 128. LUT stands for a lookup table. The storage device 12 is formed of one or more types of storage circuits such as a ROM, an EPROM, an EEPROM, a RAM, an HDD, and an SSD. ROM stands for a read only memory. EPROM stands for an erasable programmable ROM. EEPROM stands for an electrically erasable programmable ROM. RAM stands for a random access memory. HDD stands for a hard disk drive. SSD stands for a solid state drive.

The input profile 121 is a file defining a color space. The output profile 122 is a file indicating output characteristics of the first printer 40. The color space includes the apparatus-independent color space and the apparatus-dependent color space. The apparatus-dependent color space includes a CMYK color space representing colors obtained by combining cyan, magenta, yellow, and black, a CMY color space representing colors obtained by combining cyan, magenta, and yellow, and an RGB color space representing colors obtained by combining red, green, and blue.

In the following description, when only a profile is mentioned, the profile is a collective name of the input profile 121 and the output profile 122.

The apparatus-dependent color space includes the CMYK color space, the CMY color space, and the RGB color space as described above. For example, the input profile 121 may have a color conversion table regarding of each of the CMYK color space, the CMY color space, and the RGB color space, and the output profile 122 may have a color conversion table regarding each of the CMYK color space, the CMY color space, and the RGB color space. However, for simplification of description, in the first embodiment, the input profile 121 and the output profile 122 are assumed to have only color conversion tables regarding the CMYK color space with respect to the apparatus-dependent color space.

The input profile 121 has an A2B table 1211 and a B2A table 1212 as color conversion tables. The output profile 122 has an A2B table 1221 and a B2A table 1222 as color conversion tables. The input profile 121 may have other tables used for color conversion instead of the A2B table 1211 and the B2A table 1212. Here, in the first embodiment, the input profile 121 is assumed to have the A2B table 1211 and the B2A table 1212. The A2B table 1211, the B2A table 1212, the A2B table 1221, and the B2A table 1222 will be described.

Figure 2:
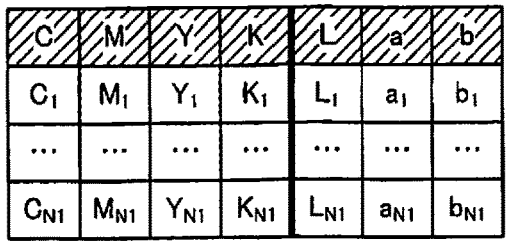
FIG. 2 is a diagram illustrating an A2B table.

FIG. 2 is a diagram illustrating the A2B table 1211. In the following description, a color space when image information included in a printing command generated through a user's operation indicates colors obtained by combining cyan, magenta, yellow, and black will be referred to as a "CMYK color space" in large letters of alphabets. The A2B table 1221 is used to convert a coordinate value in the CMYK color space into an Lab value in the Lab color space CSI. The coordinate value in the CMYK color space will be referred to as a "CMYK value". The A2B table 1211 indicates CMYK values and Lab values of N1 lattice points in the CMYK color space. N1 is an integer of 1 or greater.

The CMYK color space has a C axis, an M axis, a Y axis, and a K axis. The CMYK value is a coordinate value indicating a process color. The CMYK value has a C value, an M value, a Y value, and a K value. Each of the C value, the M value, the Y value, and the K value is a real number of 0 to 100.

The Lab color space CSI has an L axis, an a axis, and a b axis. The Lab value has an L value, an a value, and a b value.

The type of image information included in a printing command includes two colors such as a process color and a spot color. The process color is a color expressed by a combination of ink with four colors such as cyan, magenta, yellow, and black. On the other hand, the spot color is a color of ink prepared in advance. The spot color is, for example, a color defined in a color sample book such as PANTONE (registered trademark) and a color defined in a color sample book such as DIC (registered trademark).

Figure 3:
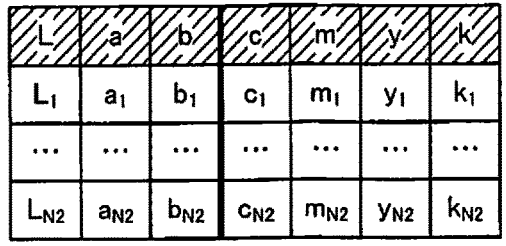
FIG. 3 is a diagram illustrating a B2A table.

FIG. 3 is a diagram illustrating the B2A table 1212. The B2A table 1212 is used to convert a Lab value in the Lab color space CSI into a coordinate value in a cmyk color space CSD illustrated in FIG. 5. A coordinate value in the cmyk color space CSD will be referred to as a "cmyk value". A color space representing colors obtained by combining cyan, magenta, yellow, and black that are input to the first printer 40 will be referred to as a cmyk color space in small letters of alphabets, so as to be differentiated from the CMYK color space in image information included in a printing command. For better understanding, a space representing a color that depends on the first printer 40 will be referred to as the cmyk color space CSD. The cmyk color space CSD is an example of a "second color space".

The cmyk value has a c value, a y value, an m value, and a k value. Each of the c value, the y value, the m value, and the k value is a real number of 0 to 100. The B2A table 1212 indicates cmyk values of N2 lattice points in the Lab color space CSI. N2 is an integer of 1 or greater.

Figure 4:
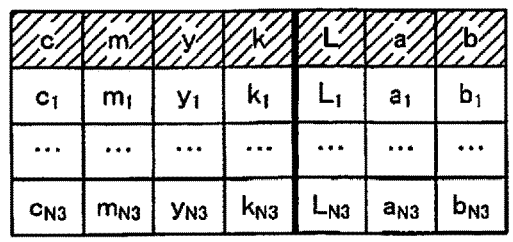
FIG. 4 is a diagram illustrating an A2B table.

FIG. 4 is a diagram illustrating the A2B table 1221. The A2B table 1221 is used to convert a cmyk value in the cmyk color space CSD into a Lab value in the Lab color space CSI. The A2B table 1221 is an example of "second conversion information".

The A2B table 1221 is a table storing Lab values that can be reproduced in the entire cmyk value region of the cmyk color space CSD depending on the first printer 40.

Figures 5, 6:
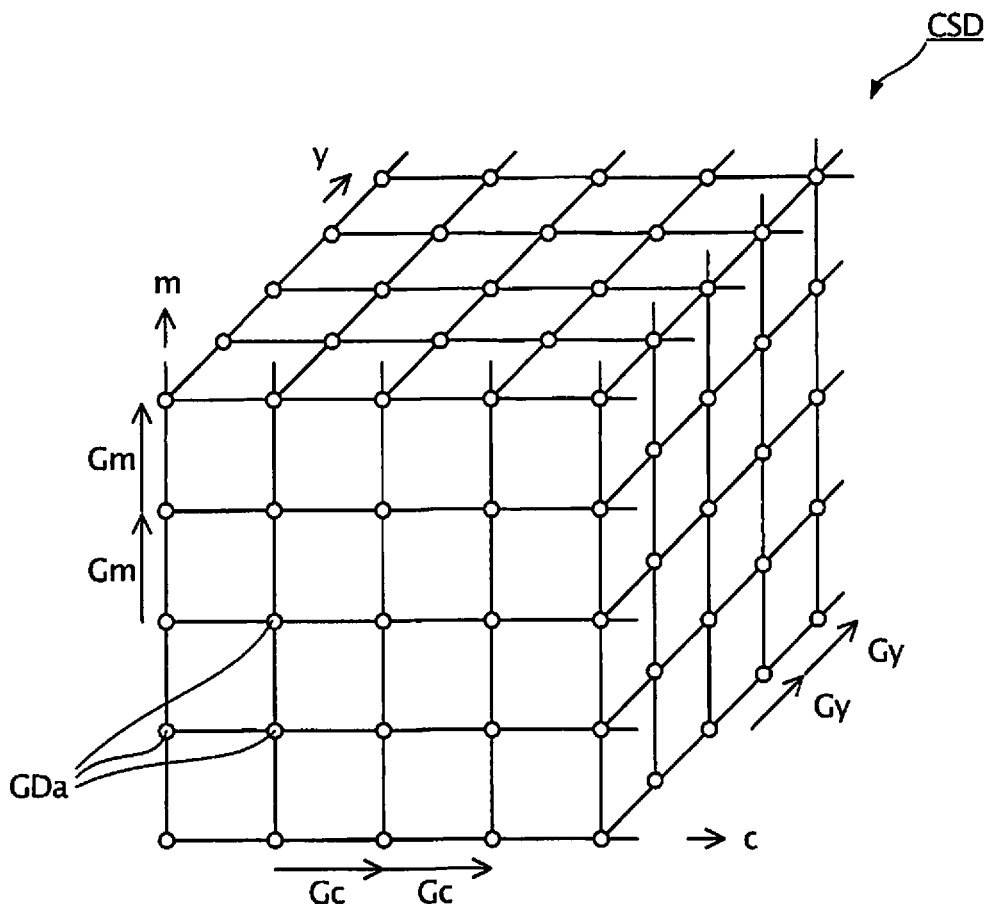
FIG. 5 is a diagram illustrating a cmyk color space.
FIG. 6 is a diagram illustrating a B2A table.

FIG. 5 is a diagram illustrating the cmyk color space CSD. The cmyk color space CSD is a four-dimensional space having the c axis, them axis, the y axis, and the k axis. For easy illustration, in FIG. 5, a three-dimensional space having the c axis, the m axis, and the y axis is illustrated. The A2B table 1221 indicates Lab values of N3 lattice points GDa in the cmyk color space CSD. N3 is an integer of 1 or greater. Void circles illustrated in FIG. 5 are the lattice points GDa. In FIG. 5, for suppression of complexity of the drawing, only some lattice points GDa are given the reference sign as representatives among the plurality of lattice points GDa. The lattice points GDa are disposed at an equal interval in the c axis direction, the m axis direction, the y axis direction, and the k axis direction in the cmyk color space CSD. More specifically, the lattice points GDa are separated from each other by an interval Gc in the c axis direction, by an interval Gm in the m axis direction, by an interval Gy in the y axis direction, and by an interval Gk (not illustrated) in the k axis direction.

FIG. 6 is a diagram illustrating the B2A table 1222. The B2A table 1222 is used to convert an Lab value in the Lab color space CSI into a cmyk value in the cmyk color space CSD. When cmyk values that can be reproduced by the first printer 40 with respect to the entire Lab region are stored in the B2A table 1222, the cmyk values are stored by taking into consideration gamut mapping onto Lab values that cannot be reproduced by the first printer 40. The gamut is a reproduction region of colors that can be expressed by an apparatus. The B2A table 1222 is an example of "first conversion information".

FIG. 7 is a diagram illustrating the Lab color space CSI. Each record of the B2A table 1222 indicates cmyk values of N4 lattice points GDb in the Lab color space CSI. N4 is an integer of 1 or greater. Void circles illustrated in FIG. 7 are the lattice points GDb. In FIG. 7, for suppression of complexity of the drawing, only some lattice points are given the reference sign as representatives among the plurality of lattice points GDb. The lattice points GDb are disposed at an equal interval in the L axis direction, the a axis direction, and the b axis direction in the Lab color space CSI. More specifically, the lattice points GDb are separated from each other by an interval GL in the L axis direction, by an interval Ga in the a axis direction, and by an interval Gb in the b axis direction.

As illustrated in FIGS. 4 and 6, the output profile 122 has the A2B table 1221 used for color conversion from a cmyk value into an Lab value and the B2A table 1222 used for color conversion from an Lab value into a cmyk value. The B2A table 1222 is a three-dimensional table subjected to gamut mapping, and the A2B table 1221 is a four-dimensional table in which a cmyk value representing a color that can be output is correlated with an Lab value. Therefore, when a certain Lab value is converted into a cmyk value according to the B2A table 1222, and the cmyk value obtained through the conversion is converted into an Lab value according to the A2B table 1221, the obtained Lab value may not be the same as the original Lab value. In the following description, a process in which a certain Lab value is converted into a cmyk value according to the B2A table 1222, and the cmyk value obtained through the conversion is converted into an Lab value according to the A2B table 1221 will be referred to as "round-trip calculation" in some cases. When the round-trip calculation is executed, an Lab value simulating printing in the first printer 40 may be obtained.

FIG. 1 is referred to again. The color library 124 is used to convert the name of a spot color into an Lab value of the spot color. Hereinafter, for simplification of description, the name of a spot color will be referred to as a "spot color name". The spot color name indicates a color represented by an Lab value. The spot color name is, for example, "Pantone P 41-8C" or "Pantone P 97-8C".

The color conversion table 126 is a table generated according to the present embodiment. The color conversion table 126 is used to convert a spot color Lab value SP_Lab into a cmyk value. A cmyk value correlated with an Lab value SP_Lab will be referred to as a "registration cmyk value pcmyk".

FIG. 8 is a diagram illustrating the color conversion table 126. As illustrated in FIG. 8, the color conversion table 126 has a spot color Lab value and a registration cmyk value reproducing a color closest to the Lab value. In the color conversion table 126 illustrated in FIG. 8, an Lab value $SP\_Lab_1$ and an Lab value $SP\_Lab_2$ are registered as two spot color Lab values, a registration cmyk value $pcmyk_1$ is correlated with the Lab value $SP\_Lab_1$, and a registration cmyk value $pcmyk_2$ is correlated with the Lab value $SP\_Lab_2$. In FIG. 8, respective components of the Lab value $SP\_Lab_1$ are ($SP\_L_1$, $SP\_a_1$, $SP\_b_1$), respective components of the Lab value $SP\_Lab_2$ are ($SP\_L_2$, $SP\_a_2$, $SP\_b_2$), respective components of the registration cmyk value $pcmyk_1$ are ($pc_1$, $pm_1$, $py_1$, $pk_1$), and respective components of the registration cmyk value pcmyk$_2$ are (pc$_2$, pm$_2$, py$_2$, pk$_2$). The color conversion table 126 may have a spot color name instead of an Lab value. Therefore, the color conversion table 126 may also be used to convert not only a spot color Lab value SP_Lab but also a spot color name into a cmyk value. Here, in the first embodiment, a description will be made assuming that the color conversion table 126 has a spot color Lab value and a cmyk value reproducing a color closest to the Lab value.

FIG. 1 is referred to again. The color correction-free LUT 128 is used to convert a cmyk value into an ink use amount INK illustrated in FIG. 9 by applying a halftone. The ink use amount INK is a use amount of ink in which the first printer 40 can perform optimal printing. In the first embodiment, the ink use amount INK has four ink use amounts such as an ink use amount of c, an ink use amount of m, an ink use amount of y, and an ink use amount of k.

The control device 13 is a processor controlling the whole host apparatus 10. The control device 13 reads a program from the storage device 12, and performs various processes by executing the read program. The control device 13 is formed of a plurality of processing devices. Some or all of the functions of the control device 13 may be realized by hardware such as a DSP, an ASIC, a PLD, or an FPGA. DSP stands for a digital signal processor. ASIC stands for an application specific integrated circuit. PLD stands for a programmable logic device. FPGA stands for a field programmable gate array.

A.2. Configuration of First Embodiment

Figure 9:
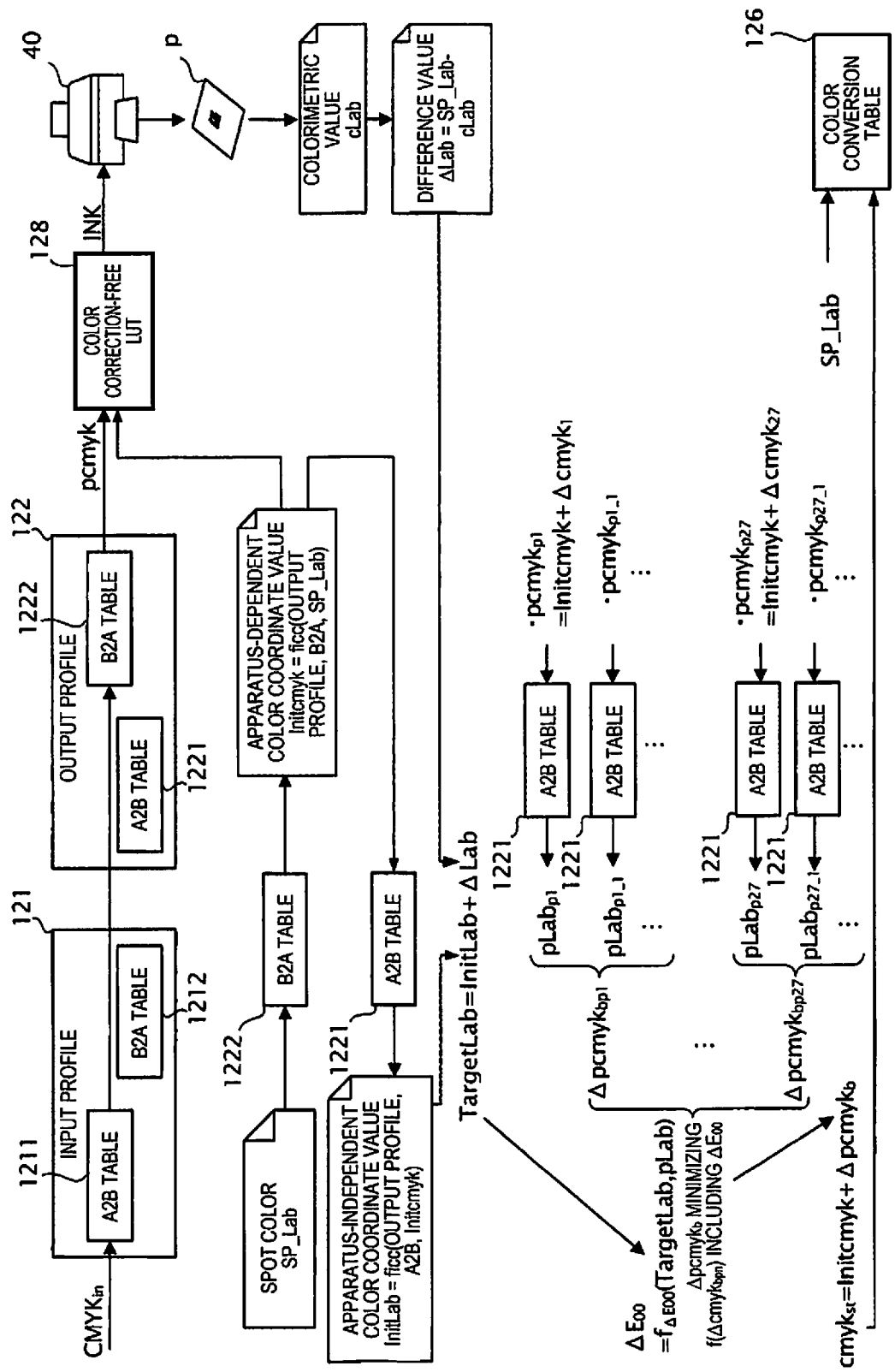
FIG. 9 is a diagram illustrating an outline of generation of the color conversion table.

The control device 13 reads a program from the storage device 12 and executes the program, so as to function as a color conversion table generation unit 130 and a printing processing unit 140. The color conversion table generation unit 130 includes a reception portion 131, a first conversion portion 132, an acquisition portion 133, a second conversion portion 134, a first determination portion 135, a first retrieval portion 136, and a first generation portion 137. The printing processing unit 140 includes a third conversion portion 142 and an output control portion 146. With reference to FIG. 9, the color conversion table generation unit 130 and the printing processing unit 140 will be described.

FIG. 9 is a diagram illustrating an outline of generation of the color conversion table 126. The reception portion 131 receives one or both of the spot color Lab value SP_Lab and a spot color name in the Lab color space CSI representing a spot color when a user operates the input device 16. The spot color Lab value SP_Lab is an example of a "first coordinate value". The spot color is an example of a "color defined by the first coordinate value". When the reception portion 131 receives only the spot color name, the control device 13 specifies the spot color Lab value SP_Lab corresponding to the received spot color name by using the color library 124. Hereinafter, for simplification of description, in the first embodiment, the reception portion 131 is assumed to receive only the spot color Lab value SP_Lab.

The first conversion portion 132 converts the spot color Lab value SP_Lab into an apparatus-dependent color coordinate value Initcmyk in the cmyk color space CSD by using the B2A table 1222. The apparatus-dependent color coordinate value Initcmyk is an example of a "second coordinate value".

Here, conversion conforming to a profile is represented by a function ficc (first argument, second argument, third argument). The first argument represents a profile to be used. The second argument represents a color conversion table used in the profile represented by the first argument. More specifically, in the second argument, A2B indicates conversion from an apparatus-dependent color into an apparatus-independent color, and B2A indicates conversion from an apparatus-independent color into an apparatus-dependent color. The third argument represents a conversion target coordinate value.

As a specific processing content, the function ficc( ) outputs a value correlated with a registered value when a value designated by the third argument matches the value registered in a table designated by the first argument and the second argument. On the other hand, when a value designated by the third argument does not match a value registered in a table designated by the first argument and the second argument, the function ficc( ) outputs a value obtained through interpolation calculation using values adjacent to the value designated by the third argument. The process in the first conversion portion 132 may be described by using the following Equation (1).

$$\text{Init}cmyk=ficc(\text{output profile } 122, B2A, \text{SP\_Lab}) \quad (1)$$

The colorimetry apparatus 30 performs a colorimetry on an output image that is output from the first printer 40 according to the apparatus-dependent color coordinate value Initcmyk, and the acquisition portion 133 acquires a colorimetric value cLab representing a colorimetric result in the Lab color space CSI from the colorimetry apparatus 30. The colorimetric value cLab is an example of a "colorimetric coordinate value". More specifically, the control device 13 converts the apparatus-dependent color coordinate value Initcmyk into the ink use amount INK by using the color correction-free LUT 128. The first printer 40 prints an image with a spot color based on the ink use amount INK. The colorimetry apparatus 30 performs a colorimetry on the image with the spot color. The acquisition portion 133 acquires the colorimetric value cLab from the colorimetry apparatus 30.

The second conversion portion 134 converts the apparatus-dependent color coordinate value Initcmyk into an apparatus-independent color coordinate value InitLab in the Lab color space CSI. The apparatus-independent color coordinate value InitLab is an example of a "third coordinate value". The process in the second conversion portion 134 may be described by using the following Equation (2).

$$\text{InitLab}=ficc(\text{output profile } 122, A2B, \text{Init}cmyk) \quad (2)$$

It may be regarded that the round-trip calculation is executed on the spot color Lab value by the first conversion portion 132 and the second conversion portion 134, and thus the apparatus-independent color coordinate value InitLab is obtained.

The first determination portion 135 determines a target Lab value TargetLab indicating a target color in the Lab color space CSI based on the apparatus-independent color coordinate value InitLab and a difference value ΔLab between the spot color Lab value SP_Lab and the colorimetric value cLab. The target Lab value TargetLab is an example of a "target coordinate value". The difference value ΔLab may be a value obtained by respectively subtracting the components of the colorimetric value cLab from the components of the spot color Lab value SP_Lab, and may be a value obtained by respectively subtracting the components of the spot color Lab value SP_Lab from the components of the colorimetric value cLab. In the first embodiment, the difference value ΔLab is assumed to be a value obtained by respectively subtracting the components of the colorimetric value cLab from the components of the spot color Lab value SP_Lab. For example, the first determination portion 135 determines the target Lab value TargetLab according to the following Equation (3).

$$\text{TargetLab} = \text{InitLab} + \Delta \text{Lab} \quad (3)$$

When the difference value ΔLab is a value obtained by respectively subtracting the components of the spot color Lab value SP_Lab from the components of the colorimetric value cLab, the first determination portion 135 determines, as the target Lab value TargetLab, a value obtained by subtracting the difference value ΔLab from the apparatus-independent color coordinate value InitLab.

The first retrieval portion 136 retrieves, as an optimal cmyk value $\text{cmyk}_{st}$, a provisional cmyk value $\text{pcmyk}_p$ satisfying a condition that a color difference between a provisional Lab value $\text{pLab}_p$ in the Lab color space CSI and the target Lab value TargetLab is smaller than a color difference between the apparatus-independent color coordinate value InitLab and the target Lab value TargetLab, the provisional Lab value $\text{pLab}_p$ being obtained by converting the provisional cmyk value $\text{pcmyk}_p$ in the cmyk color space CSD by using the A2B table 1221. The color difference includes, for example, the color difference $\Delta E_{00}$ represented by the CIEDE2000 Color-difference formula, the color difference $\Delta E^*_{94}$ represented by the CIE1994 Color-difference formula, the color difference $\Delta E^*ab$, so-called $\Delta E^*_{76}$ based on the Lab color system proposed in 1976, or the color difference $\Delta E^*uv$ based on the CIE L*u*v* color system. In the first embodiment, $\Delta E_{00}$ is used as the color difference, and will be hereinafter referred to as the color difference $\Delta E_{00}$.

The color difference $\Delta E_{00}$ may be obtained by using a function $f\Delta E_{00}$ (first argument, second argument). Details of the function $f\Delta E_{00}(\ )$ will be omitted for simplification of description. The color difference $\Delta E_{00}$ between the provisional Lab value $\text{pLab}_p$ and the target Lab value TargetLab is obtained by assigning the provisional Lab value $\text{pLab}_p$ to the first argument of the function $f\Delta E_{00}(\ )$ and assigning the target Lab value TargetLab to the second argument. Similarly, the color difference $\Delta E_{00}$ between the apparatus-independent color coordinate value InitLab and the target Lab value TargetLab is obtained by assigning the apparatus-independent color coordinate value InitLab to the first argument of the function $f\Delta E_{00}(\ )$ and assigning the target Lab value TargetLab to the second argument.

The optimal cmyk value $\text{cmyk}_{st}$ is an example of a "fourth coordinate value". A Lab value obtained by converting the optimal cmyk value $\text{cmyk}_{st}$ by using the A2B table 1221 is an example of a "fifth coordinate value".

The process in the first retrieval portion 136 includes, for example, two aspects described below. In a first aspect, the first retrieval portion 136 calculates the color difference $\Delta E_{00}$ between the provisional Lab value $\text{pLab}_p$ and the target Lab value TargetLab. The provisional cmyk value $\text{pcmyk}_p$ that is a conversion source of the provisional Lab value $\text{pLab}_p$ is any cmyk value. However, the provisional cmyk value $\text{pcmyk}_p$ is preferably a value closest to the apparatus-dependent color coordinate value Initcmyk, and is more preferably the same as that. When the color difference $\Delta E_{00}$ between the provisional Lab value $\text{pLab}_p$ and the target Lab value TargetLab satisfies the condition of being smaller than the color difference $\Delta E_{00}$ between the apparatus-independent color coordinate value InitLab and the target Lab value TargetLab, the first retrieval portion 136 outputs the provisional cmyk value $\text{pcmyk}_p$ as the optimal cmyk value $\text{cmyk}_{st}$. On the other hand, when the color difference $\Delta E_{00}$ between the provisional Lab value $\text{pLab}_p$ and the target Lab value TargetLab does not satisfy the condition, the first retrieval portion 136 repeatedly changes the provisional cmyk value $\text{pcmyk}_p$ until the optimal cmyk value $\text{cmyk}_{st}$ is found. A change amount of the provisional cmyk value $\text{pcmyk}_p$ is, for example, a fixed value.

In the second aspect, the first retrieval portion 136 executes a first retrieval process of changing a first adjustment value Δcmyk1 such that an output value of an objective function including the color difference $\Delta E_{00}$ between a first provisional Lab value $\text{pLab}_{p1}$ and the target Lab value TargetLab is reduced, the first provisional Lab value $\text{pLab}_{p1}$ being obtained by converting a first provisional cmyk value $\text{pcmyk}_{p1}$ by using the A2B table 1221, the first provisional cmyk value $\text{pcmyk}_{p1}$ being obtained by adding the first adjustment value Δcmyk1 to the provisional cmyk value $\text{pcmyk}_p$. The first retrieval portion 136 executes a second retrieval process of changing a second adjustment value Δcmyk2 such that an output value of an objective function including the color difference $\Delta E_{00}$ between a second provisional Lab value $\text{pLab}_{p2}$ and the target Lab value TargetLab is reduced, the second provisional Lab value $\text{pLab}_{p2}$ being obtained by converting a second provisional cmyk value $\text{pcmyk}_{p2}$ by using the A2B table 1221, the second provisional cmyk value $\text{pcmyk}_{p2}$ being obtained by adding the second adjustment value Δcmyk2 to the provisional cmyk value $\text{pcmyk}_p$. When an output value of the objective function at the time of finishing of the first retrieval process is smaller than an output value of the objective function at the time of finishing of the second retrieval process, the first retrieval portion 136 specifies the first provisional cmyk value $\text{pcmyk}_{p1}$ at the time of finishing of the first retrieval process as the optimal cmyk value $\text{cmyk}_{st}$. On the other hand, when the output value of the objective function at the time of finishing of the second retrieval process is smaller, the first retrieval portion 136 specifies the second provisional cmyk value $\text{pcmyk}_{p2}$ at the time of finishing of the second retrieval process as the optimal cmyk value $\text{cmyk}_{st}$.

The first provisional cmyk value $\text{pcmyk}_{p1}$ is an example of a "first provisional coordinate value". The first adjustment value Δcmyk1 is an example of a "first adjustment coordinate value". The first provisional Lab value $\text{pLab}_{p1}$ is an example of a "first conversion coordinate value". The second provisional cmyk value $\text{pcmyk}_{p2}$ is an example of a "second provisional coordinate value". The second adjustment value Δcmyk2 is an example of a "second adjustment coordinate value". The second provisional Lab value $\text{pLab}_{p2}$ is an example of a "second conversion coordinate value". The first adjustment value Δcmyk1 and the second adjustment value Δcmyk2 are four-dimensional vectors having Δc, Δm, Δy, and Δk as components.

The first retrieval portion 136 may perform a retrieval process of changing the adjustment value Δcmyk by solving an optimization problem of minimizing an output value of an objective function including the color difference $\Delta E_{00}$ between each provisional cmyk value $\text{pcmyk}_p$ and the target Lab value TargetLab by using a plurality of provisional cmyk values $\text{pcmyk}_p$ including the first provisional cmyk value $\text{pcmyk}_{p1}$ and the second provisional cmyk value $\text{pcmyk}_{p2}$. In the first embodiment, the first retrieval portion 136 executes a retrieval process on each provisional cmyk value $\text{pcmyk}_p$ from the first provisional cmyk value $\text{pcmyk}_{p1}$ to the twenty-seventh provisional cmyk value $\text{pcmyk}_{p27}$. The first retrieval portion 136 specifies, as the optimal cmyk value $\text{cmyk}_{st}$, the provisional cmyk value $\text{pcmyk}_p$ at the time of finishing of a retrieval process in which an output value of the objective function is smallest among retrieval processes on the respective provisional cmyk values $\text{pcmyk}_p$.

The objective function is expressed by, for example, the following Equation (4).

$$f(\Delta cmyk) = \Delta E_{00}^2 + w \times V^2 + C \qquad (4)$$

The term ($w \times V^2$) is provided to suppress any of the respective components of the adjustment value Δcmyk from considerably increasing. The coefficient w is a positive number. The coefficient w is preferably more than 1 and equal to or less than 10. The magnitude V is a magnitude of the adjustment value Δcmyk. The cost C is a constant to be adjusted such that the provisional cmyk value $pcmyk_p$ satisfies a condition that a range that can be taken by each component of a cmyk value is 0 to 100.

A method of solving the optimization problem may employ, for example, a quasi-Newton method, a Newton method, or a conjugate gradient method. When the quasi-Newton method is used, for example, a BFGS method or a DFP method may be used. BFGS stands for Broyden-Fletcher-Goldfarb-Shanno. DFP stands for Davidon-Fletcher-Powell. As a method of solving the optimization problem, in the first embodiment, the BFGS method of the quasi-Newton method is used.

As a method of specifying the provisional cmyk value $pcmyk_p$ satisfying the condition by solving the optimization problem with respect to each of twenty-seven initial values, for example, the first retrieval portion 136 specifies, as the optimal cmyk value $cmyk_{st}$, a cmyk value indicated by a solution candidate in which a value of the objective function f(Δcmyk) is smaller among solution candidates obtained by solving the optimization problem with respect to each of the twenty-seven initial values.

FIG. 9 illustrates an example in which the first retrieval portion 136 solves the optimization problem by using the first provisional cmyk value $pcmyk_{p1}$ to the twenty-seventh provisional cmyk value $pcmyk_{p27}$ as initial values. The first provisional cmyk value $pcmyk_{p1}$ may be expressed as a value obtained by adding an initial value $\Delta cmyk_1$ to the apparatus-dependent color coordinate value Initcmyk. A provisional cmyk value $pcmyk_{p1\_1}$ illustrated in FIG. 9 is a value changed from the first provisional cmyk value $pcmyk_{p1}$ by a minute amount. The twenty-seventh provisional cmyk value $pcmyk_{p27}$ may be expressed as a value obtained by adding an initial value $\Delta cmyk_{27}$ to the apparatus-dependent color coordinate value Initcmyk. A provisional cmyk value $pcmyk_{p27\_1}$ illustrated in FIG. 9 is a value changed from the twenty-seventh provisional cmyk value $pcmyk_{p27}$ by a minute amount. A first provisional Lab value $pLab_{p1}$, a provisional Lab value $pLab_{p1\_1}$, twenty-seventh provisional Lab value $pLab_{p27}$, and a provisional Lab value $pLab_{p27\_1}$ illustrated in FIG. 9 are values obtained by respectively converting the first provisional cmyk value $pcmyk_{p1}$, the provisional cmyk value $pcmyk_{p1\_1}$, the twenty-seventh provisional cmyk value $pcmyk_{p27}$, and the provisional cmyk value $pcmyk_{p27\_1}$ by using the A2B table 1221.

As illustrated in FIG. 9, the first retrieval portion 136 solves the optimization problem by using the first provisional cmyk value $pcmyk_{p1}, \ldots$, and the twenty-seventh provisional cmyk value $pcmyk_{p27}$ as initial values, and thus obtains an optimal solution candidate $\Delta cmyk_{pb1}, \ldots$, and an optimal solution candidate $\Delta cmyk_{pb27}$. Next, the first retrieval portion 136 specifies an optimal solution $\Delta cmyk_b$ minimizing the objective function f($\Delta cmyk_{pbn}$) from among the optimal solution candidate $\Delta cmyk_{pb1}, \ldots$, and the optimal solution candidate $\Delta cmyk_{pb27}$, and specifies, as the optimal cmyk value $cmyk_{st}$, a value obtained by adding the optimal solution $\Delta cmyk_b$ to the apparatus-dependent color coordinate value Initcmyk. Here, n is a value of 1 to 27.

The first generation portion 137 generates the color conversion table 126 based on the spot color Lab value SP_Lab and the optimal cmyk value $cmyk_{st}$. An example of generating the color conversion table 126 includes the following two aspects. In a first aspect, the first generation portion 137 stores the spot color Lab value SP_Lab and the optimal cmyk value $cmyk_{st}$ in the color conversion table 126 in correlation with each other. In a second aspect, the first generation portion 137 copies the B2A table 1222, determines an adjustment amount of an output value for a lattice point most adjacent to the spot color Lab value SP_Lab based on the optimal cmyk value $cmyk_{st}$, and reflects the determined adjustment amount in the copied B2A table. The first generation portion 137 converts the spot color Lab value SP_Lab into the registration cmyk value pcmyk by using the copied B2A table, and stores the spot color Lab value SP_Lab and the registration cmyk value pcmyk in the color conversion table 126 in correlation with each other. The copied B2A table is discarded. Therefore, an adjustment result is not reflected in the B2A table 1222. Hereinafter, a description will be made assuming that the first generation portion 137 generates the color conversion table 126 according to the second aspect.

During execution of a printing process, image information included in a printing command supplied to the first printer 40 is any of a CMYK value, a coordinate value in an RGB color space, an Lab value indicating a spot color, and a spot color name. The coordinate value in the RGB color space will be hereinafter referred to as an "RGB value". When the image information is an Lab value or a spot color name, a printing command supplied to the first printer 40 may be said to be a printing command for printing an apparatus-independent color. The printing command is an example of an "output command". In the first embodiment, for simplification of description, the description will be made assuming that image information included in a printing command is a CMYK value, an Lab value indicating a spot color, or a spot color name. A case where image information included in a printing command is a CMYK value will be described with reference to FIG. 9, and a case where image information included in a printing command is an Lab value or a spot color name will be described with reference to FIG. 1.

When image information indicating a printing target image that is output to the first printer 40 is a CMYK value $CMYK_{in}$, the control device 13 converts the CMYK value $CMYK_{in}$ into an Lab value by using the A2B table 1211, and converts the Lab value into the registration cmyk value pcmyk by using the B2A table 1222. The control device 13 converts the registration cmyk value pcmyk into the ink use amount INK by using the color correction-free LUT 128, and causes the first printer 40 to print an image indicated by the image information according to the ink use amount INK.

FIG. 1 is referred to again. When image information indicating a printing target image output to the first printer 40 is an Lab value, the third conversion portion 142 converts the Lab value into a cmyk value by using the color conversion table 126. When image information indicating a printing target image output to the first printer 40 is a spot color name, the third conversion portion 142 converts the spot color name into an Lab value by using the color library 124, and converts the Lab value into a cmyk value by using the color conversion table 126.

The output control portion 146 causes the first printer 40 to output an image according to the cmyk value as a result of being converted by the third conversion portion 142.

More specifically, the control device 13 converts the cmyk value into the ink use amount INK by using the color correction-free LUT 128, and prints an image according to the ink use amount INK.

Figure 10:
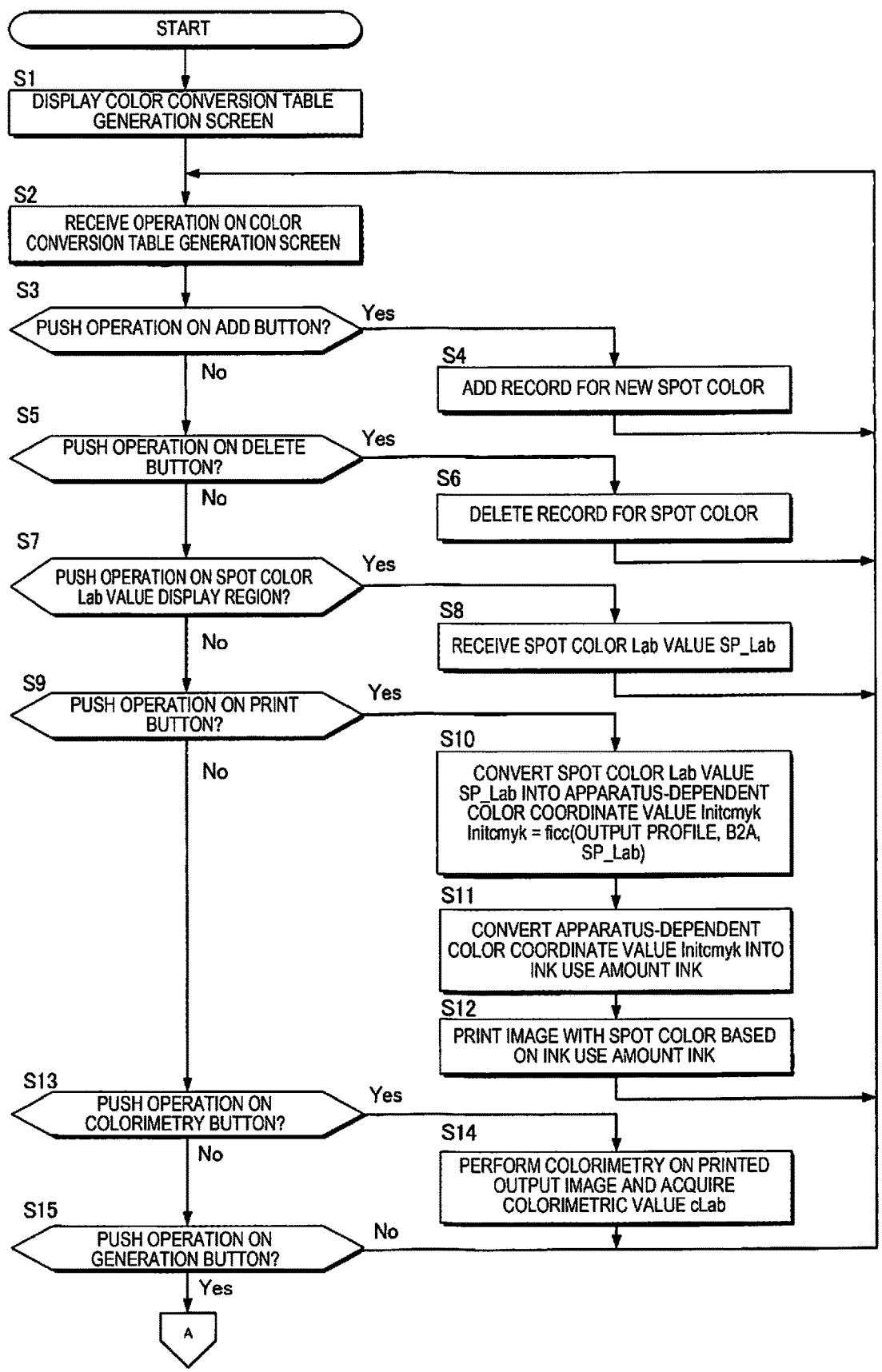
FIG. 10 is a flowchart illustrating a color conversion table generation process.
Figure 11:
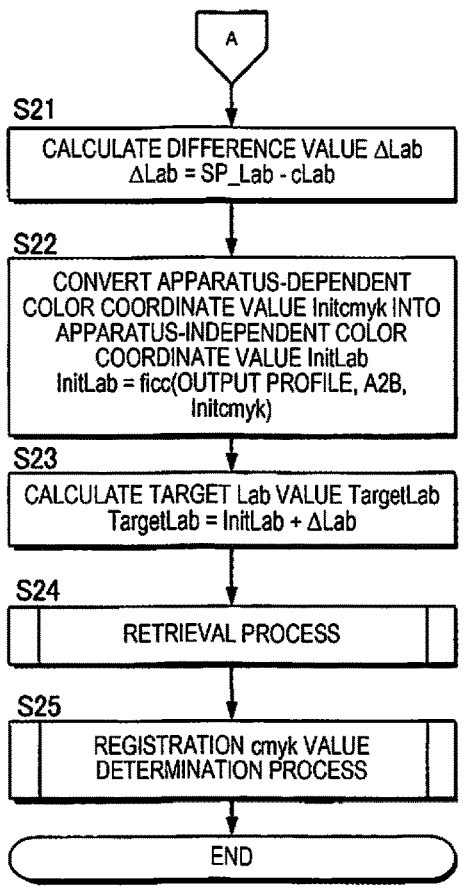
FIG. 11 is a flowchart illustrating the color conversion table generation process.

A.3. Operation of Color Conversion Table Generation System 1 During Execution of Color Conversion Table Generation Process FIGS. 10 and 11 are flowcharts illustrating a color conversion table generation process. In step S1, the display apparatus 20 displays a color conversion table generation screen 220 illustrated in FIG. 12 under the control of the control device 13.

Figure 12:
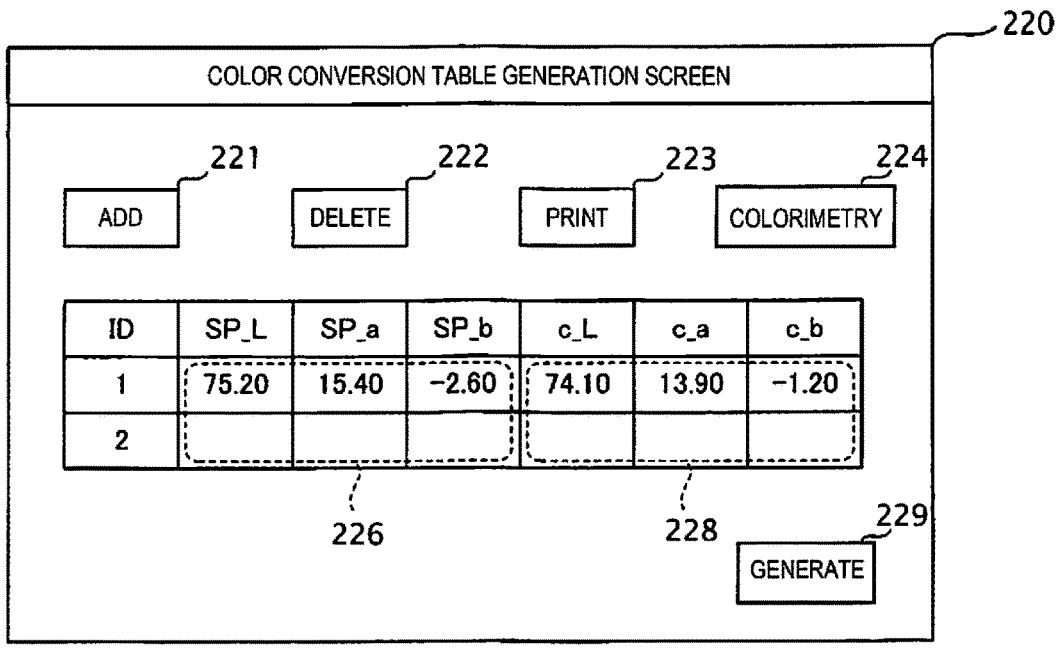
FIG. 12 is a diagram illustrating an example of a color conversion table generation screen.

FIG. 12 is a diagram illustrating an example of the color conversion table generation screen 220. The color conversion table generation screen 220 is a screen used to generate the color conversion table 126. The color conversion table generation screen 220 includes an add button 221, a delete button 222, a print button 223, a colorimetry button 224, a spot color Lab value display region 226, a colorimetric value display region 228, and a generate button 229. Each of the spot color Lab value display region 226 and the colorimetric value display region 228 has a record indicating information regarding a spot color for each spot color.

On the color conversion table generation screen 220, each of a plurality of spot colors may be registered in the color conversion table 126. However, for simplification of description, in the following description, the description will be made assuming that a single spot color is registered in the color conversion table 126 unless otherwise mentioned.

FIG. 10 is referred to again. In step S2, the control device 13 receives an operation on the color conversion table generation screen 220. In step S3, the control device 13 determines whether or not a push operation on the add button 221 has been received. When a determination result in step S3 is affirmative, in step S4, the control device 13 updates the color conversion table generation screen 220 such that records for a new spot color are added to the spot color Lab value display region 226 and the colorimetric value display region 228. The display apparatus 20 displays the updated color conversion table generation screen 220. The updated color conversion table generation screen 220 is displayed, and then the control device 13 returns to the process in step S2.

When the determination result in step S3 is negative, in step S5, the control device 13 determines whether or not a push operation on the delete button 222 has been received. When a determination result in step S5 is affirmative, in step S6, the control device 13 updates the color conversion table generation screen 220 such that records of the spot color Lab value display region 226 and the colorimetric value display region 228 are deleted. The display apparatus 20 displays the updated color conversion table generation screen 220. The updated color conversion table generation screen 220 is displayed, and then the control device 13 returns to the process in step S2.

When the determination result in step S5 is negative, in step S7, the control device 13 determines whether or not a push operation on the spot color Lab value display region 226 has been received. When a determination result in step S7 is affirmative, in step S8, the control device 13 receives the spot color Lab value SP_Lab through a user's operation on the input device 16. FIG. 12 illustrates an example in which the L value of 75.20, the a value of 15.40, and the b value of −2.60 are received on the color conversion table generation screen 220.

The user's input aspect includes the following two aspects. In a first aspect, the user inputs a spot color Lab value, and the control device 13 displays the input Lab value in the spot color Lab value display region 226. In a second aspect, the user inputs the name of a spot color, and the control device 13 acquires an Lab value corresponding to the input name of the color by using the color library 124, and displays the acquired Lab value in the spot color Lab value display region 226.

The Lab value is displayed in the spot color Lab value display region 226, and then the control device 13 executes the process in step S2 again.

When the determination result in step S7 is negative, in step S9, the control device 13 determines whether or not a push operation on the print button 223 has been received. When a determination result in step S9 is affirmative, in step S10, the control device 13 converts the spot color Lab value SP_Lab into the apparatus-dependent color coordinate value Initcmyk by using the B2A table 1222. The process in step S10 may be described by using the above Equation (1).

Next, in step S11, the control device 13 converts the apparatus-dependent color coordinate value Initcmyk into the ink use amount INK by using the color correction-free LUT 128. In step S12, the control device 13 causes the first printer 40 to print an image with the spot color based on the ink use amount INK. After the process in step S12 is finished, the control device 13 executes the process in step S2 again.

When the determination result in step S9 is negative, in step S13, the control device 13 determines whether or not a push operation on the colorimetry button 224 has been received. When a determination result in step S13 is affirmative, in step S14, the colorimetry apparatus 30 performs a colorimetry on an output image printed by the first printer 40, and the control device 13 acquires the colorimetric value cLab. The control device 13 displays the acquired colorimetric value cLab in the colorimetric value display region 228. FIG. 12 illustrates an example in which the L value of 74.10, the a value of 13.90, and the b value of −1.20 as the colorimetric value cLab are acquired on the color conversion table generation screen 220. After the process in step S14 is finished, the control device 13 executes the process in step S2 again.

When the determination result in step S13 is negative, in step S15, the control device 13 determines whether or not a push operation on the generate button 229 has been received. When the determination result in step S15 is negative, the control device 13 executes the process in step S2 again.

When a determination result in step S15 is affirmative, in step S21, the control device 13 calculates the difference value ΔLab by subtracting the colorimetric value cLab from the spot color Lab value SP_Lab. The process in step S21 may be described by using the following equation.

$$\Delta Lab = SP\_Lab - cLab$$

In step S22, the control device 13 converts the apparatus-dependent color coordinate value Initcmyk into the apparatus-independent color coordinate value InitLab by using the A2B table 1221. The process in step S22 may be described by using the above Equation (2).

Next, in step S23, the control device 13 calculates the target Lab value TargetLab by adding the difference value ΔLab to the apparatus-dependent color coordinate value Initcmyk. The process in step S23 may be described by using the above Equation (3).

In step S24, the control device 13 executes a retrieval process. The retrieval process will be described with reference to FIG. 13.

Figure 13:
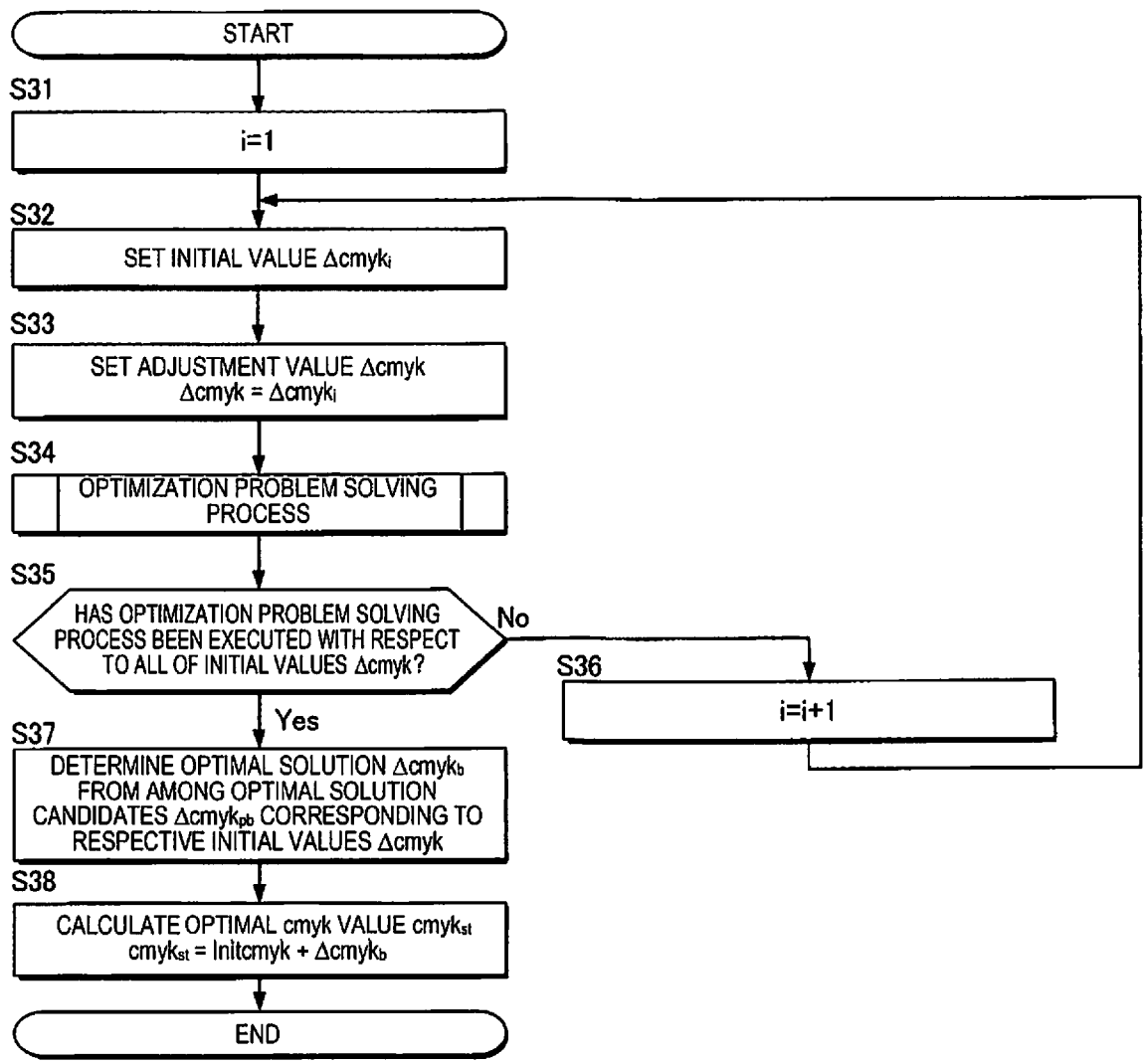
FIG. 13 is a flowchart illustrating a retrieval process.

FIG. 13 is a flowchart illustrating the retrieval process. In the retrieval process, an optimal solution $\Delta\text{cmyk}_b$ at which the provisional Lab value $\text{pLab}_p$ is as close to the target Lab value TargetLab as possible is received, the provisional Lab value $\text{pLab}_p$ being obtained by converting the provisional cmyk value $\text{pcmyk}_p$ by using the A2B table 1221, the provisional cmyk value $\text{pcmyk}_p$ being obtained by adding the adjustment value $\Delta\text{cmyk}$ to the apparatus-dependent color coordinate value Initcmyk. More specifically, in the retrieval process, the objective function $f(\Delta\text{cmyk})$ having the adjustment value $\Delta\text{cmyk}$ as an argument is set, and the optimal solution $\Delta\text{cmyk}_b$ is retrieved by solving an optimization problem minimizing the objective function $f(\Delta\text{cmyk})$.

In the quasi-Newton method, retrieval using a differential function is performed, convergence to a local solution occurs, and thus a correct optimal solution may not be obtained. In order to suppress convergence to a local solution, in the retrieval process, a plurality of initial values $\Delta\text{cmyk}$ are given, and optimal solution candidates $\Delta\text{cmyk}_{pb}$ are obtained by applying the quasi-Newton method to each of the initial values $\Delta\text{cmyk}$. In the retrieval process, the optimal solution $\Delta\text{cmyk}_b$ is determined based on the optimal solution candidates $\Delta\text{cmyk}_{pb}$ corresponding to the respective initial values.

In the retrieval process, the control device 13 assigns 1 to a variable i in step S31. The variable i is a variable for identifying each of the plurality of initial values $\Delta\text{cmyk}$. In the following description, the initial value $\Delta\text{cmyk}$ is a collective name of all initial values $\Delta\text{cmyk}_i$. Next, in step S32, the control device 13 sets the initial value $\Delta\text{cmyk}_i$ of the adjustment value $\Delta\text{cmyk}$.

Figure 14:
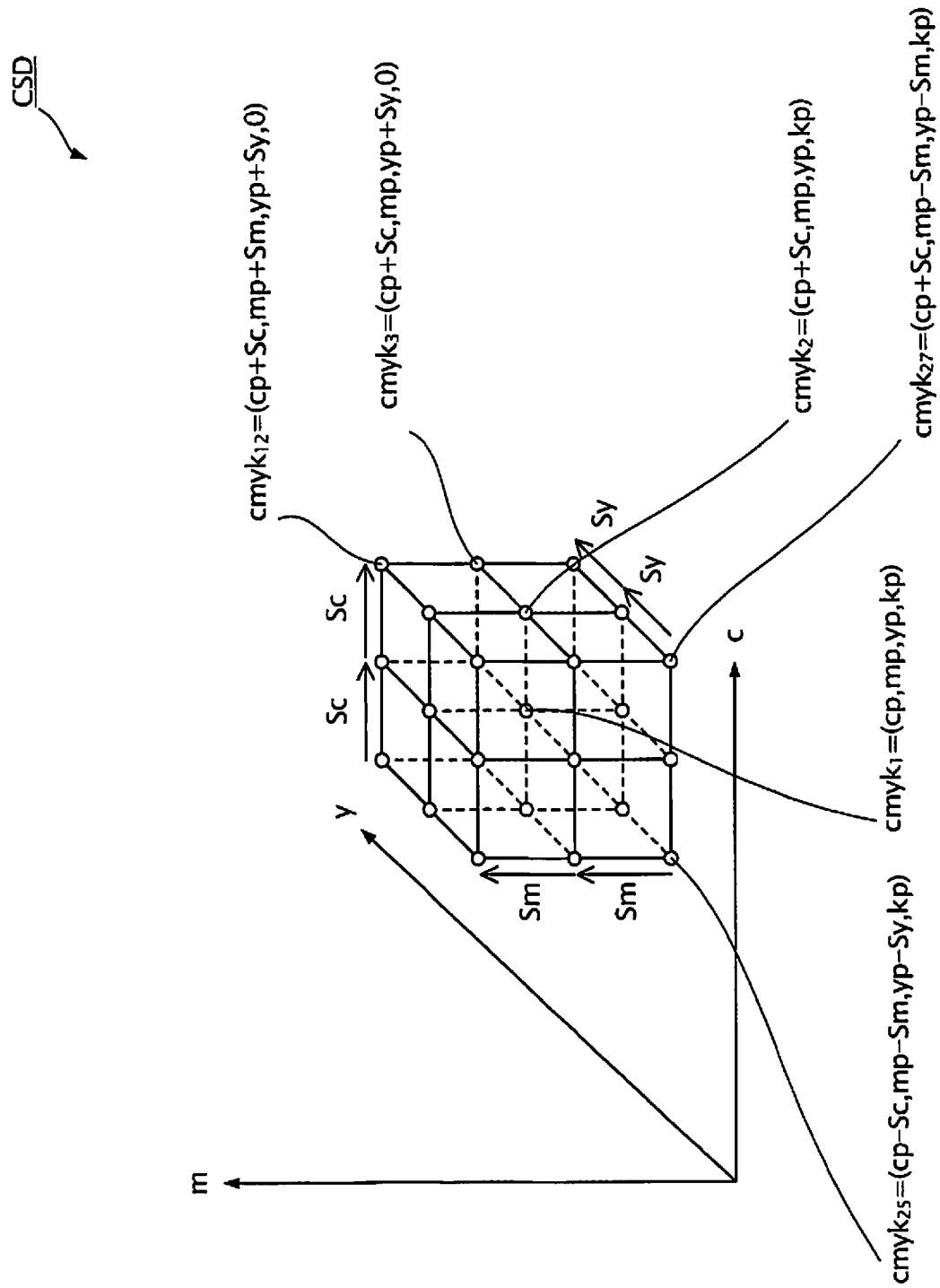
FIG. 14 is a diagram illustrating an initial value Δcmyk.

FIG. 14 is a diagram illustrating the initial value $\Delta\text{cmyk}$. Each lattice point in the cmyk color space CSD illustrated in FIG. 14 indicates a position of the initial value $\Delta\text{cmyk}$. For suppression of complexity of the drawing, FIG. 14 illustrates a relationship with the initial value $\Delta\text{cmyk}$ with respect to only some lattice points. In the following description, the respective components of the initial value $\Delta\text{cmyk}_i$ are indicated by $(\Delta ci, \Delta mi, \Delta yi, \Delta ki)$. In the retrieval process, the initial value $\Delta\text{cmyk}_1$ is $(0, 0, 0, 0)$. In the first embodiment, the initial values $\Delta\text{cmyk}$ of twenty-seven points formed by three points to which the c value is shifted by a predetermined interval Sc, three points to which the m value is shifted by a predetermined interval Sm, and three points to which the y value is shifted by a predetermined interval Sy, centering on the initial value $\Delta\text{cmyk}_1$. The predetermined interval Sc, the predetermined interval Sm, and the predetermined interval Sy are real numbers greater than 0. The variable i is an integer of 1 to 27. In order to speed up the retrieval process, $\Delta ki$ is set to 0. Therefore, the respective components $(\Delta ci, \Delta mi, \Delta yi, \Delta ki)$ of the initial value $\Delta\text{cmyk}_i$ are as follows.

$(\Delta c1, \Delta m1, \Delta y1, \Delta k1) = (0, 0, 0, 0)$ $(\Delta c2, \Delta m2, \Delta y2, \Delta k2) = (+Sc, 0, 0, 0)$ $(\Delta c3, \Delta m3, \Delta y3, \Delta k3) = (+Sc, 0, +Sy, 0)$

...

$(\Delta c12, \Delta m12, \Delta y12, \Delta k12) = (+Sc, +Sm, +Sy, 0)$

...

-continued $(\Delta c25, \Delta m25, \Delta y25, \Delta k25) = (-Sc, -Sm, -Sy, 0)$

...

$(\Delta c27, \Delta m27, \Delta y27, \Delta k27) = (+Sc, -Sm, -Sy, 0)$

As described above, in the first embodiment, $\Delta ki$ is set to 0, but shift may be performed by a predetermined interval Sk centering on $\Delta\text{cmyk}_1$. The predetermined interval Sk is a real number greater than 0. In the first embodiment, the number of initial values $\Delta\text{cmyk}$ is twenty-seven, but may be any numbers other than twenty-seven, such as eight or eighty-one.

The predetermined interval Sc, the predetermined interval Sm, and the predetermined interval Sy may be respectively 0.5 or more times and two or less times larger than, for example, the interval Gc, the interval Gm, and the interval Gy of the lattice points GDa indicated by the A2B table 1221 in the cmyk color space CSD. This may be expressed as in the following expressions.

$0.5 \times Gc \leq Sc \leq 2 \times Gc$ $0.5 \times Gm \leq Sm \leq 2 \times Gm$ $0.5 \times Gy \leq Sy \leq 2 \times Gy$ When the predetermined interval Sc, the predetermined interval Sm, and the predetermined interval Sy are respectively 0.5 or more times and two or less times larger than the interval Gc, the interval Gm, and the interval Gy, the optimal solution $\Delta\text{cmyk}_b$ can be efficiently retrieved.

When shift is performed by a predetermined interval Sk centering on $\Delta\text{cmyk}_1$, for example, the predetermined intervals may be respectively 0.5 or more times and two or less times larger than the intervals of the lattice points GDa in the k axis direction.

FIG. 13 is referred to again. In step S33, the control device 13 assigns the initial value $\Delta\text{cmyk}_i$ to the adjustment value $\Delta\text{cmyk}$. The process in step S33 may be described by using the following equation.

$\Delta\text{cmyk} = \Delta\text{cmyk}_i$

Next, in step S34, the control device 13 executes an optimization problem solving process. An optimization problem solving process when the variable is 1 corresponds to a "first retrieval process". An optimization problem solving process when the variable is 2 corresponds to a "second retrieval process". The optimization problem solving process will be described with reference to FIG. 15.

Figure 15:
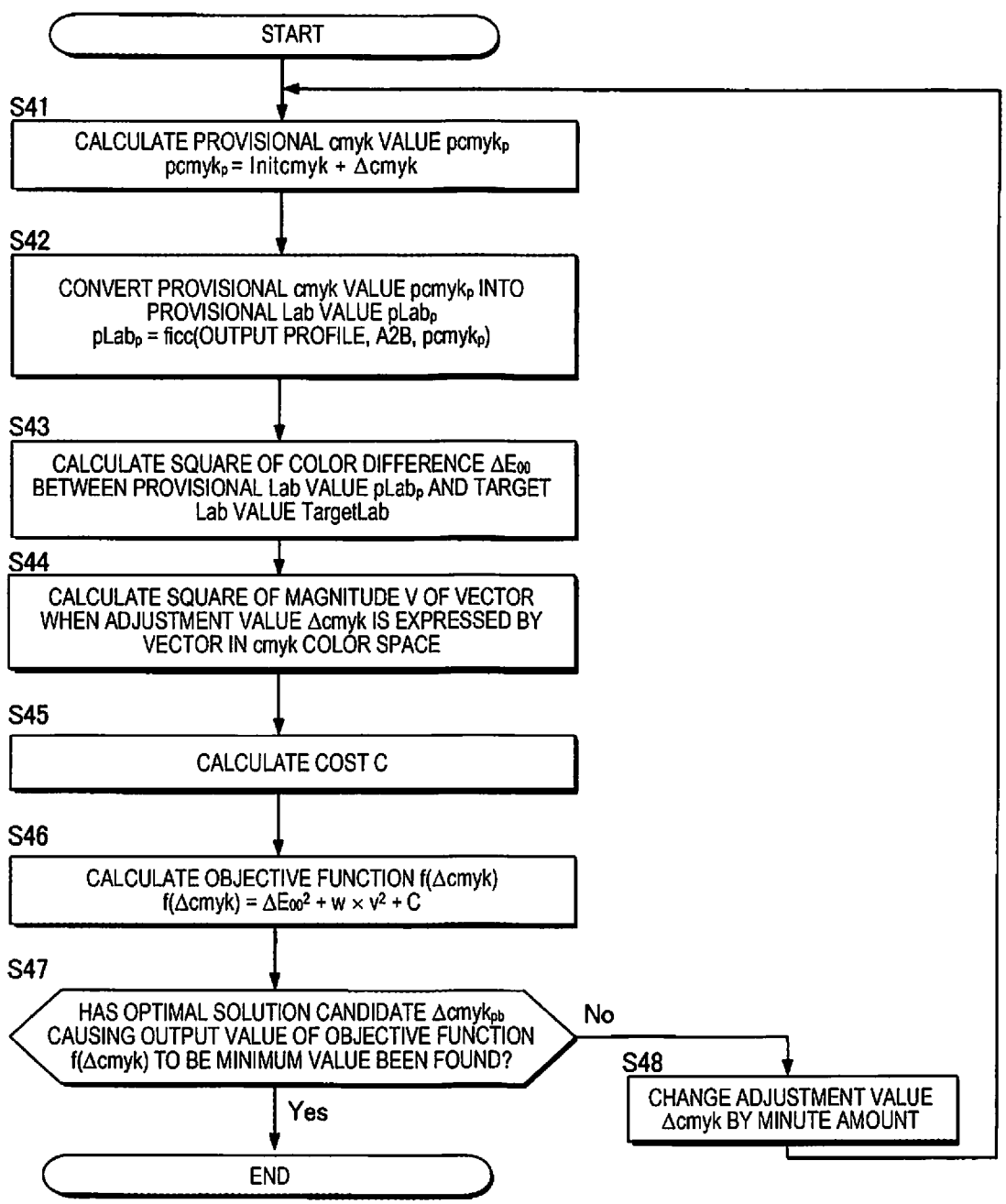
FIG. 15 is a flowchart illustrating an optimization problem solving process.

FIG. 15 is a flowchart illustrating the optimization problem solving process. In the optimization problem solving process, the optimal solution candidate $\Delta\text{cmyk}_{pb}$ corresponding to one initial value $\Delta\text{cmyk}_i$ among the plurality of initial values $\Delta\text{cmyk}_i$ is obtained by using the BFGS method of the quasi-Newton method.

In step S41, the control device 13 calculates the provisional cmyk value $\text{pcmyk}_p$ by adding the adjustment value $\Delta\text{cmyk}$ to the apparatus-dependent color coordinate value Initcmyk. The process in step S41 may be described by using the following equation.

$\text{pcmyk}_p = \text{Initcmyk} + \Delta\text{cmyk}$

In step S42, the control device 13 converts the provisional cmyk value $\text{pcmyk}_p$ into the provisional Lab value $\text{pLab}_p$ by using the A2B table 1221. The process in step S42 may be described by using the following equation.

$\text{pLab}_p = \text{ficc}(\text{output profile 122, A2B, pcmyk}_p)$

Processes in step S43 to step S45 are processes for obtaining respective terms of the objective function f(Δcmyk). The objective function f(Δcmyk) is expressed by the above Equation (4).

In step S43, the control device 13 calculates the square of the color difference $\Delta E_{00}$ between the provisional Lab value $pLab_p$ and the target Lab value TargetLab. An equation for calculating the color difference $\Delta E_{00}$ will be omitted for simplification of description.

In step S44, the control device 13 calculates the square of the magnitude V of a vector when the adjustment value Δcmyk is expressed by the vector in the cmyk color space CSD.

In step S45, the control device 13 calculates the cost C. In order for the provisional cmyk value $pcmyk_p$ to satisfy the condition that a range that can be taken by each component of a cmyk value is 0 to 100, the control device 13 calculates the cost C according to the following equations. In the following equations, respective components of the provisional cmyk value $pcmyk_p$ are expressed by ($c_{pp}$, $m_{pp}$, $y_{pp}$, $k_{pp}$).

$$C = -c_{pp} \times C_{co} \text{ if } c_{pp} < 0$$

$$C = (c_{pp} - 100) \times C_{co} \text{ if } c_{pp} > 100$$

$$C = -m_{pp} \times C_{co} \text{ if } m_{pp} < 0$$

$$C = (m_{pp} - 100) \times C_{co} \text{ if } m_{pp} > 100$$

$$C = -y_{pp} \times C_{co} \text{ if } y_{pp} < 0$$

$$C = (y_{pp} - 100) \times C_{co} \text{ if } y_{pp} > 100$$

$$C = -k_{pp} \times C_{co} \text{ if } k_{pp} < 0$$

$$C = (k_{pp} - 100) \times C_{co} \text{ if } k_{pp} > 100$$

$$C = 0 \text{ if otherwise}$$

The coefficient $C_{co}$ is a positive number, and is preferably about $10^3$ to $10^9$ that is a sufficiently greater number than the range of 0 to 100 that can be taken by each component of a cmyk value.

The control device 13 may calculate the cost C based on factors other than the condition that a range that can be taken by each component of a cmyk value is 0 to 100. For example, when an error occurs when the processes in step S41 to step S45 are executed, the control device 13 may add a value of 103 to 109 to the cost C.

Since the respective terms of the objective function f(Δcmyk) are obtained through the processes in step S43 to step S45, the control device 13 calculates the objective function f(Δcmyk) and obtains an output value in step S46.

In step S47, the control device 13 repeatedly executes the processes in step S41 to step S46 until the optimal solution candidate $\Delta cmyk_{pb}$ causing an output value of the objective function f(Δcmyk) to be the minimum value is found. When the process in step S47 is executed for the first time, it cannot be determined whether or not an output value of the objective function f(Δcmyk) is the minimum value, and, thus, in step S48, the control device 13 changes the adjustment value Δcmyk by a minute amount and then returns the process to step S41. The minute amount is set based on the BFGS method. When the process in step S47 is executed for the second and subsequent times, the control device 13 executes the process in step S48 when the optimal solution candidate $\Delta cmyk_{pb}$ is not found. When the optimal solution candidate $\Delta cmyk_{pb}$ is found, the control device 13 finishes the series of processes illustrated in FIG. 15, and executes a process in step S35 illustrated in FIG. 13.

FIG. 13 is referred to again. In step S35, the control device 13 determines whether or not the optimization problem solving process has been executed with respect to all of the initial values Δcmyk. When a determination result in step S35 is negative, that is, there is the initial value Δcmyk on which the optimization problem solving process has not been executed, the control device 13 increments the variable i by 1 in step S36, and returns the process to step S32. On the other hand, when the determination result in step S35 is affirmative, in step S37, the control device 13 determines the optimal solution $\Delta cmyk_b$ from among the optimal solution candidates $\Delta cmyk_{pb}$ corresponding to the respective initial values Δcmyk.

In step S38, the control device 13 calculates the optimal cmyk value $cmyk_{st}$ by adding the optimal solution $\Delta cmyk_b$ to the apparatus-dependent color coordinate value Initcmyk. The process in step S38 may be described by using the following equation.

$$cmyk_{st} = \text{Init}cmyk + \Delta cmyk_b$$

After the process in step S38 is finished, the control device 13 finishes the series of processes illustrated in FIG. 13, and executes a process in step S25 illustrated in FIG. 11.

Figure 16:
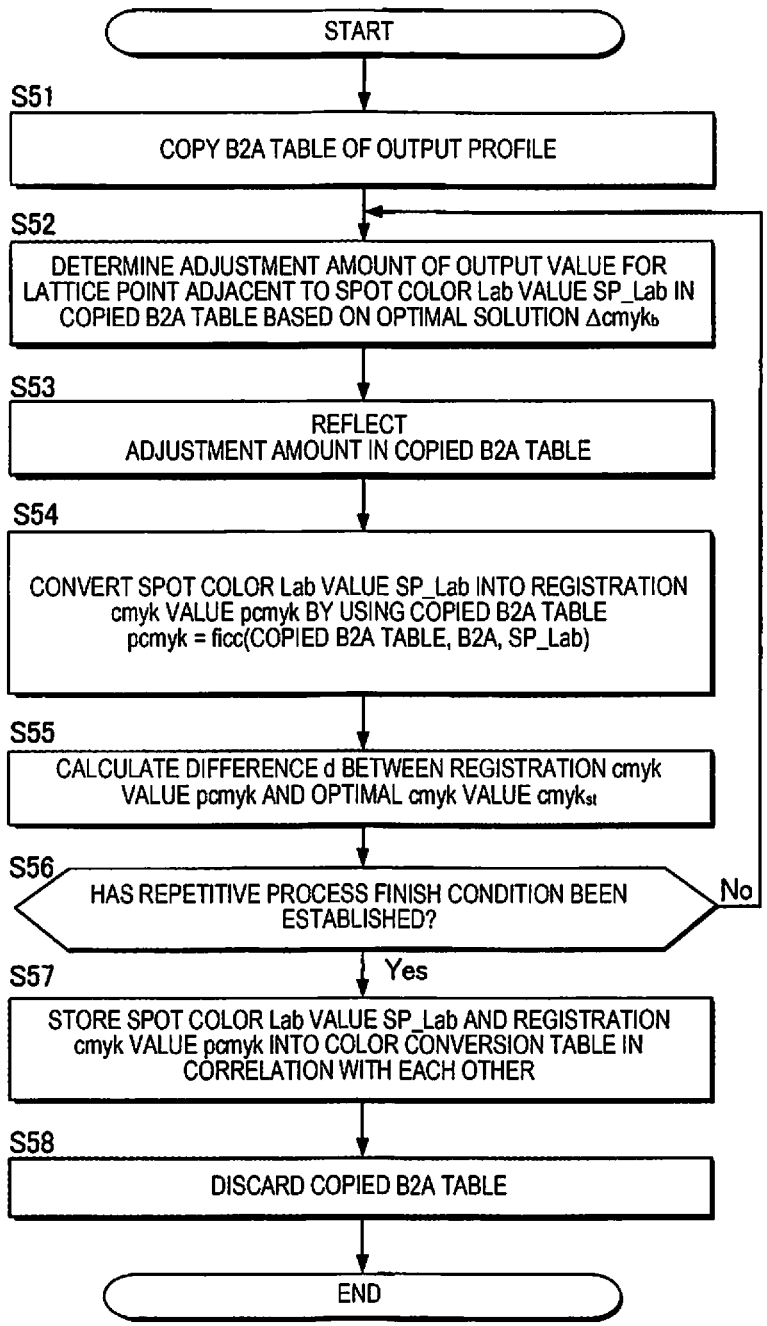
FIG. 16 is a flowchart illustrating a registration cmyk value determination process.

FIG. 11 is referred to again. In step S25, the control device 13 executes a registration cmyk value determination process, and finishes the series of processes illustrated in FIGS. 10 and 11. With reference to FIG. 16, the registration cmyk value determination process will be described.

FIG. 16 is a flowchart illustrating the registration cmyk value determination process. In step S51, the control device 13 copies the B2A table 1222 of the output profile 122. For example, it is assumed that the storage device 12 is formed of an HDD and a RAM, and the B2A table 1222 is stored in the HDD. The control device 13 copies the B2A table 1222 stored in the HDD onto the RAM.

Next, in step S52, the control device 13 determines an adjustment amount of an output value for a lattice point adjacent to the spot color Lab value SP_Lab in the copied B2A table 1222 based on the optimal solution $\Delta cmyk_b$. A lattice point that is an adjustment target includes not only a lattice point most adjacent to the spot color Lab value SP_Lab but also eight adjacent lattice points located at vertexes of a cube containing the spot color Lab value SP_Lab. For example, the control device 13 determines the optimal solution $\Delta cmyk_b$ as an adjustment amount.

When a plurality of spot colors are registered in the color conversion table 126, some of the eight adjacent lattice points corresponding to the plurality of spot colors may be the same as each other. A description will be made of an adjustment amount when some of the eight adjacent lattice points may be the same as each other.

In the copied B2A table, the control device 13 determines an adjustment amount Xn based on an optimal solution $\Delta cmyk_{b(SP\_Lab1)}$ corresponding to a spot color Lab value SP_Lab1 as an adjustment amount for eight adjacent lattice points GPSP_Lab1 including the spot color Lab value SP_Lab1. Similarly, the control device 13 determines an adjustment amount Ym based on an optimal solution $\Delta cmyk_{b(SP\_Lab2)}$ corresponding to a spot color Lab value SP_Lab2 as an adjustment amount for eight adjacent lattice points GPSP_Lab2 including the spot color Lab value SP_Lab2. When there is a lattice point included in both of the eight adjacent lattice points GPSP_Lab1 and the eight adjacent lattice points GPSP_Lab2, the control device 13 updates an adjustment amount for the adjacent lattice point included in both thereof by using an average value of the adjustment amount Xn and the adjustment amount Ym.

In step S53, the control device 13 reflects the adjustment amount in the copied B2A table.

Next, in step S54, the control device 13 converts the spot color Lab value SP_Lab into the registration cmyk value pcmyk by using the copied B2A table. The process in step S54 may be described by using the following equation.

$$pcmyk = ficc(\text{copied } B2A \text{ table}, B2A, SP\_Lab)$$

In step S55, the control device 13 calculates a difference d between the registration cmyk value pcmyk and the optimal cmyk value $cmyk_{st}$. In step S56, the control device 13 determines whether or not a repetitive process finish condition has been established. The finish condition includes the following two aspects. A first aspect of the finish condition is that the color difference $\Delta E_{00}$ between a Lab value obtained by converting the registration cmyk value pcmyk by using the A2B table 1221 and the spot color Lab value SP_Lab is equal to or less than a predetermined threshold value. A second aspect of the finish condition is that the number of times of determination in step S56 reaches a predetermined number of times. When a determination result in step S56 is negative, the control device 13 returns to the process in step S52.

When the determination result in step S56 is affirmative, in step S57, the control device 13 stores the spot color Lab value SP_Lab and the registration cmyk value pcmyk into the color conversion table 126. Next, in step S58, the control device 13 discards the copied B2A table. After the process in step S58 is finished, the control device 13 finishes the series of processes illustrated in FIG. 16.

When a plurality of spot colors are registered in the color conversion table 126, the control device 13 may execute the processes in step S21 to step S25 illustrated in FIG. 11 for each spot color.

Figure 17:
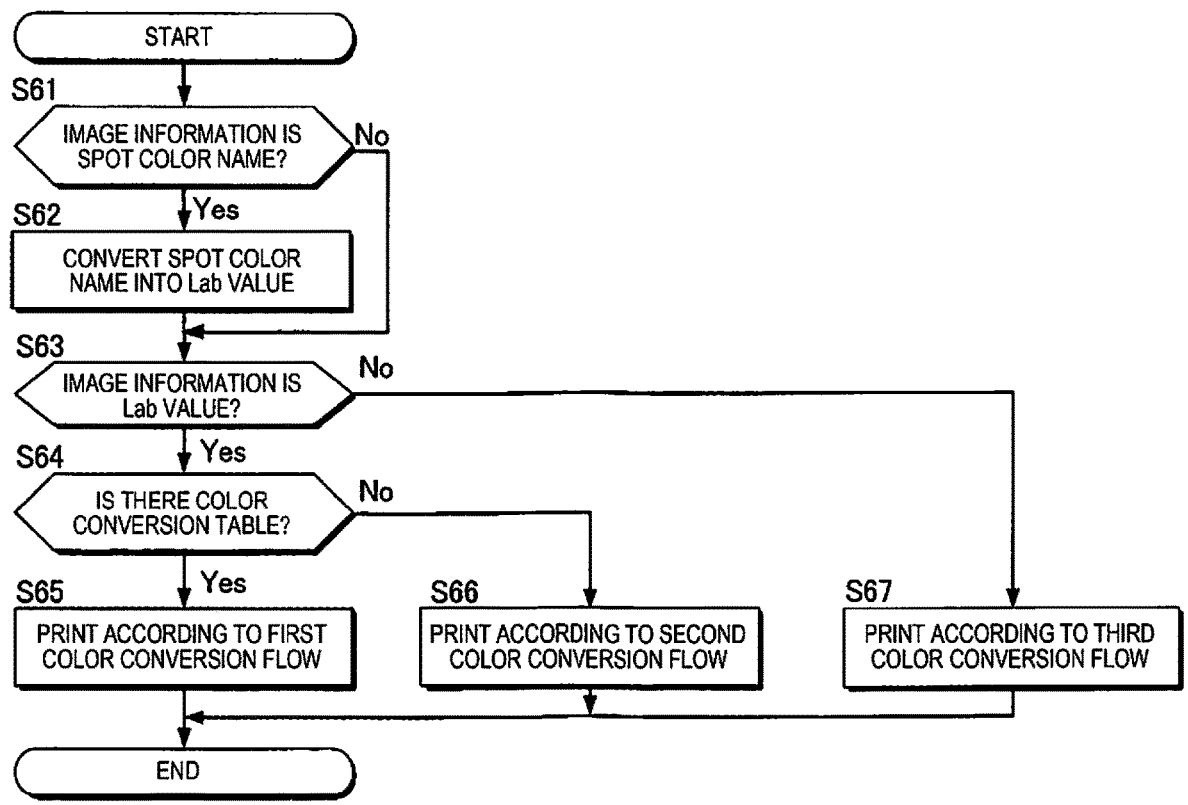
FIG. 17 is a flowchart illustrating an operation when a printing process is executed.

A.4. Operation of Color Conversion Table Generation System 1 During Execution of Printing Process FIG. 17 is a flowchart illustrating an operation during execution of a printing process. When a printing command supplied to the first printer 40 is received through a user's operation or the like, in step S61, the control device 13 determines whether or not image information included in the printing command is a spot color name. When the image information is the spot color name, this indicates that a spot color is designated. When a determination result in step S61 is affirmative, in step S62, the control device 13 converts the spot color name into an Lab value by using the color library 124. In step S63, the control device 13 determines whether or not the image information is an Lab value. When the determination result in step S61 is negative, that is, the image information included in the printing command is an Lab value or a CMYK value, in step S63, the control device 13 determines whether or not the image information is an Lab value.

When a determination result in step S63 is affirmative, in step S64, the control device 13 determines whether or not the storage device 12 includes the color conversion table 126. When a determination result in step S64 is affirmative, in step S65, the control device 13 prints an image indicated by the image information according to a first color conversion flow.

Figure 18:
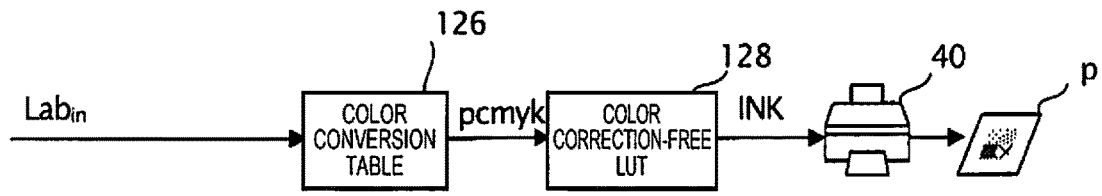
FIG. 18 is a diagram illustrating a first color conversion flow.

FIG. 18 is a diagram illustrating the first color conversion flow. In the first color conversion flow, the control device 13 converts an Lab value $Lab_{in}$ as the image information into the registration cmyk value pcmyk by using the color conversion table 126. Next, the control device 13 converts the registration cmyk value pcmyk obtained through the conversion into the ink use amount INK by using the color correction-free LUT 128. The control device 13 causes the first printer 40 to print an image indicated by the Lab value $Lab_{in}$ on a medium p based on the ink use amount INK obtained through the conversion.

FIG. 17 is referred to again. When the determination result in step S64 is negative, in step S66, the control device 13 prints an image indicated by image information according to a second color conversion flow.

Figure 19:
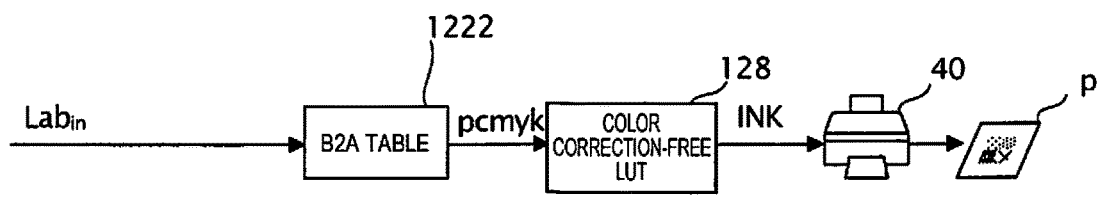
FIG. 19 is a diagram illustrating a second color conversion flow.

FIG. 19 is a diagram illustrating the second color conversion flow. In the second color conversion flow, the control device 13 converts the Lab value $Lab_{in}$ as the image information into a cmyk value pcmyk by using the B2A table 1222. Next, the control device 13 converts the cmyk value pcmyk obtained through the conversion into the ink use amount INK by using the color correction-free LUT 128. The control device 13 causes the first printer 40 to print an image indicated by the Lab value $Lab_{in}$ on the medium p based on the ink use amount INK obtained through the conversion.

FIG. 17 is referred to again. When the determination result is negative, that is, the image information is a CMYK value, in step S63, the control device 13 prints an image indicated by image information according to a third color conversion flow.

Figure 20:
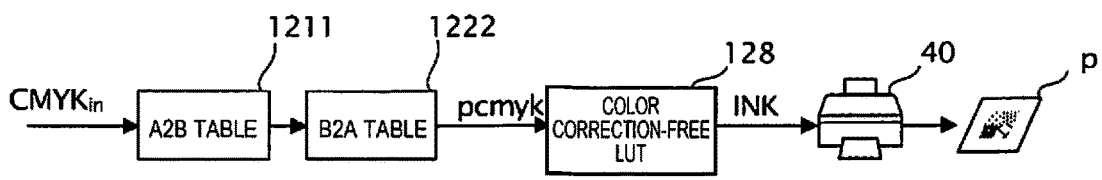
FIG. 20 is a diagram illustrating a third color conversion flow.

FIG. 20 is a diagram illustrating the third color conversion flow. In the third color conversion flow, the control device 13 converts a CMYK value $CMYK_{in}$ as the image information into an Lab value by using the A2B table 1211. Next, the control device 13 converts the Lab value obtained through the conversion into the cmyk value pcmyk by using the B2A table 1222. Next, the control device 13 converts the cmyk value pcmyk obtained through the conversion into the ink use amount INK by using the color correction-free LUT 128. The control device 13 causes the first printer 40 to print an image indicated by the CMYK value $CMYK_{in}$ on the medium p based on the ink use amount INK obtained through the conversion.

The process in step S65, step S66, or step S67 is finished, and then the control device 13 finishes the series of processes illustrated in FIG. 17.

A.5. Effects of First Embodiment

As described above, in the color conversion table generation system 1, the control device 13 included in the host apparatus 10 functions as the reception portion 131, the first conversion portion 132, the acquisition portion 133, the second conversion portion 134, the first determination portion 135, the first retrieval portion 136, and the first generation portion 137. The reception portion 131 functions as a reception step. The first conversion portion 132 functions as a first conversion step. The acquisition portion 133 functions as an acquisition step. The second conversion portion 134 functions as a second conversion step. The first determination portion 135 functions as a determination step. The first retrieval portion 136 functions as a retrieval step. The first generation portion 137 functions as a generation step.

The first generation portion 137 generates the color conversion table 126 used to convert an Lab value corresponding to a spot color into a cmyk value. Consequently, in execution of a printing process, when the first printer 40 prints an Lab value corresponding to a spot color, a correction process of correcting a cmyk value obtained from the B2A table 1222 is not performed by using correction information indicating a correction value corresponding to the spot color. Therefore, in the first embodiment, when a printing command regarding an apparatus-independent color is supplied to the first printer 40, it is possible to reduce the time required for a printing process compared with a case where the correction process is performed.

In a case where correction information indicating a correction value corresponding to a spot color is used when a content of the B2A table 1222 is changed, a content of the correction information is also required to be changed, and thus a load related to changing of the content of the B2A table 1222 is increased. On the other hand, in the first embodiment, even when a content of the B2A table 1222 is changed, the color conversion table 126 is not required to be changed, and thus it is possible to reduce a load related to changing of the content of the B2A table 1222.

The first retrieval portion 136 prepares a plurality of provisional cmyk values pcmyk$_p$, and specifies the optimal cmyk value cmyk$_{st}$ by solving an optimization problem with respect to each thereof. Generally, when an optimization problem is solved by using an initial value, convergence to a local solution occurs, and thus a correct optimal solution may not be obtained. In the first embodiment, even though a solution obtained by solving an optimization problem with respect to a certain initial value is a local solution when an optimization problem is solved with respect to each of a plurality of initial values, a correct optimal solution can be obtained when a solution obtained by solving an optimization problem with respect to other initial values is an optimal solution. Therefore, in the first embodiment, it is possible to increase a possibility that a correct optimal solution can be obtained compared with a case where of solving an optimization problem by using a single initial value.

In execution of a printing process, in the first embodiment, when image information included in a printing command supplied to the first printer 40 is an Lab value corresponding to a spot color, the third conversion portion 142 converts the Lab value into a cmyk value by using the color conversion table 126, and the output control portion 146 causes the first printer 40 to output an image according to the cmyk value obtained through the conversion in the third conversion portion 142. The third conversion portion 142 functions as a third conversion step. The output control portion 146 functions as an output control step. Consequently, in the first embodiment, since a correction process of correcting a cmyk value obtained from the B2A table 1222 is not performed by using correction information indicating a correction value corresponding to the spot color, it is possible to reduce the time required for a printing process compared with a case where the correction process is performed.

B. Second Embodiment

The color conversion table generation system 1 of the first embodiment includes the first printer 40. On the other hand, a color conversion table generation system 1a of a second embodiment includes two printers such as the first printer 40 and a second printer 50. In the second embodiment, a description will be made of a method in which the color conversion table 126 generated by using the first printer 40 is also used for a case where the second printer 50 performs printing.

Hereinafter, a description will be made of the color conversion table generation system 1a according to the second embodiment. In the second embodiment exemplified below, a constituent element having an operation or a function equivalent to that of the first embodiment will be given the same reference sign, and a detailed description of each constituent element will not be repeated as appropriate.

B.1. Outline of Color Conversion Table Generation System 1a

Figure 21:
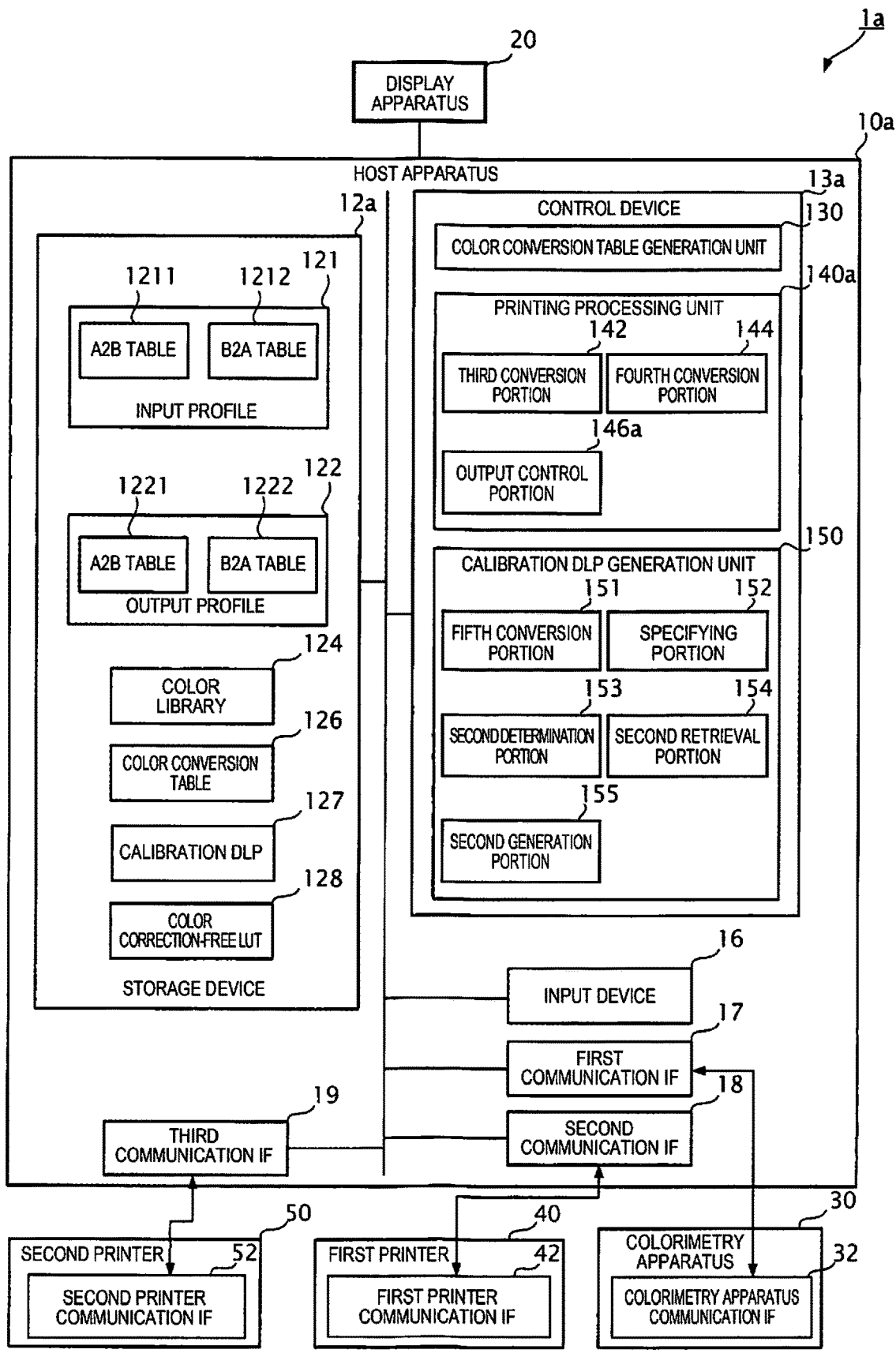
FIG. 21 is a diagram illustrating a configuration of a color conversion table generation system.

FIG. 21 is a diagram illustrating a configuration of the color conversion table generation system 1a. The color conversion table generation system 1a includes a host apparatus 10a, a display apparatus 20, a colorimetry apparatus 30, a first printer 40, and a second printer 50. The second printer 50 is an example of a "second output apparatus". The host apparatus 10a may access the display apparatus 20, the colorimetry apparatus 30, the first printer 40, and the second printer 50.

The second printer 50 is an ink jet printer having the same function as that of the first printer 40. However, a printer has an individual output characteristic, and there is a variation in the output characteristic. Due to the variation, when the first printer 40 and the second printer 50 print images indicated by an identical cmyk value, colors of the printed images may be different from each other.

The host apparatus 10 includes a storage device 12a, a control device 13a, an input device 16, a first communication IF 17, a second communication IF 18, and a third communication IF 19. The third communication IF 19 is a device performing communication with a second printer communication IF 52 of the second printer 50. As a standard for the third communication IF 19 and the second printer communication IF 52, for example, the USB or a short-range radio communication standard may be used. Communication in the third communication IF 19 and the second printer communication IF 52 may be wired communication, may be wireless communication, and network communication using a LAN or the Internet.

The storage device 12a stores a plurality of programs, various pieces of data used by the control device 13a, an input profile 121, an output profile 122, a color library 124, a color conversion table 126, a calibration DLP 127, and a color correction-free LUT 128. DLP stands for a device link profile. The calibration DLP 127 is an example of "calibration color conversion information".

FIG. 22 is a diagram illustrating the calibration DLP 127. The calibration DLP 127 indicates a correspondence relationship between a cmyk value cmyk0, and a correction value at which a color of an image printed by the second printer 50 is close to a color of an image printed by the first printer 40 according to the cmyk value cmyk0. The correction value has, for example, the following two aspects.

A correction value in a first aspect is a cmyk value cmyk1 at which the second printer 50 can print an image with a color close to a color of an image printed by the first printer 40. A correction value in a second aspect is a difference between the cmyk value cmyk1 and the cmyk value cmyk0. In the following description, the correction value in the first aspect is used, the cmyk value cmyk0 will be referred to as an "input cmyk value cmyk0", and the cmyk value cmyk1 will be referred to as a "correction cmyk value cmyk1".

The calibration DLP 127 illustrated in FIG. 22 indicates the correction cmyk values cmyk1 at N5 lattice points in the cmyk color space CSD. N5 is an integer of 1 or greater.

B.2. Configuration of Second Embodiment

FIG. 21 is referred to again. The control device 13a reads a program from the storage device 12a and executes the program, so as to function as a color conversion table generation unit 130, a printing processing unit 140a, and a calibration DLP generation unit 150. The printing processing unit 140a includes a third conversion portion 142, a fourth conversion portion 144, and an output control portion 146a. The calibration DLP generation unit 150 includes a fifth conversion portion 151, a specifying portion 152, a second determination portion 153, a second retrieval portion 154, and a second generation portion 155. With reference to FIG. 23, the calibration DLP generation unit 150 and the printing processing unit 140a will be described.

FIG. 23 is a diagram illustrating an outline of generation of the calibration DLP 127. The control device 13a causes the first printer 40 to print a color chart $CH_T$ that is an image in which a color patch PA is disposed, according to an adjustment target cmyk value $cmyk_{S2}$ registered in the color conversion table 126. The number of color patches PA matches the number of adjustment target cmyk values $cmyk_{S2}$. Similarly, the control device 13a causes the second printer 50 to print a color chart $CH_P$ that is an image in which the color patch PA is disposed, according to the adjustment target cmyk value $cmyk_{S2}$. As mentioned above, the control device 13a causes the first printer 40 and the second printer 50 to print the identical adjustment target cmyk value $cmyk_{S2}$. However, as described above, there is a difference between output characteristics of the first printer 40 and the second printer 50, and thus the color chart $CH_T$ and the color chart $CH_P$ are different images.

The fifth conversion portion 151 converts the adjustment target cmyk value $cmyk_{S2}$ into an adjustment target Lab value $Lab_{S2}$ in the Lab color space CSI by using a second printer characteristic A2B table 1276.

FIG. 24 is a diagram illustrating an example of the second printer characteristic A2B table 1276. The second printer characteristic A2B table 1276 indicates a correspondence relationship between a cmyk value ccmyk corresponding to a color patch of an ECI chart in the cmyk color space CSD, and a colorimetric value $cLab_{ECI\_P}$ representing a colorimetric result in the Lab color space CSI, obtained through a colorimetry of the ECI chart that is output from the second printer 50. ECI stands for the European Color Initiative. The second printer characteristic A2B table 1276 indicates Lab values at N6 lattice points in the cmyk color space CSD. N6 is an integer of 1 or greater. N6 is the number of color patches of the ECI chart. Lattice points in the second printer characteristic A2B table 1276 may be generally arranged at substantially equal intervals in the c axis direction, the m axis direction, the y axis direction, and the k axis direction in the cmyk color space CSD.

FIG. 23 is referred to again. The specifying portion 152 specifies a colorimetric value difference $\Delta Lab_{T\_P\_S2}$ corresponding to the adjustment target Lab value $Lab_{S2}$ by using a colorimetric result difference table 1274.

FIG. 25 is a diagram illustrating an example of the colorimetric result difference table 1274. The colorimetric result difference table 1274 indicates a correspondence relationship between a colorimetric value $cLab_P$ and a colorimetric value difference $\Delta cLab_{T\_P}$. The colorimetric value $cLab_P$ indicates a colorimetric result of performing a colorimetry on the color chart $CH_P$ printed by the second printer 50. The colorimetric value difference $\Delta cLab_{T\_P}$ is a value obtained by subtracting the colorimetric value $cLab_P$ from a colorimetric value $cLab_T$. The colorimetric value $cLab_T$ indicates a colorimetric result of performing a colorimetry on the color chart $CH_T$ printed by the first printer 40. The colorimetric value difference $\Delta cLab_{T\_P}$ has $\Delta L$, $\Delta a$, and $\Delta b$. N7 records corresponding to the number of color patches PA are registered in the colorimetric result difference table 1274. For example, in a j-th record, $L_j$, $a_j$, and $b_j$ are registered as the colorimetric value $cLab_P$ corresponding to a j-th color patch PA, and $(\Delta L_{T\_P})_j$, $(\Delta a_{T\_P})_j$, and $(\Delta b_{T\_P})_j$ are registered as the colorimetric value difference $\Delta cLab_{T\_P}$ corresponding to the j-th color patch PA. Here, j is an integer of 1 to N7.

Since the same Lab value as the adjustment target Lab value $Lab_{S2}$ is registered in the colorimetric result difference table 1274, the specifying portion 152 specifies the colorimetric value difference $\Delta cLab_{T\_P}$ corresponding to the registered Lab value as the colorimetric value difference $\Delta cLab_{T\_P\_S2}$.

FIG. 23 is referred to again. The second determination portion 153 determines the target Lab value TargetLab in the Lab color space CSI based on the adjustment target Lab value $Lab_{S2}$ and the colorimetric value difference $\Delta Lab_{T\_P\_S2}$. For example, the second determination portion 153 determines a value obtained by adding the colorimetric value difference $\Delta Lab_{T\_P\_S2}$ to the adjustment target Lab value $Lab_{S2}$ as the target Lab value TargetLab in the Lab color space CSI.

The colorimetric value difference may be obtained by subtracting the colorimetric value $cLab_T$ from the colorimetric value $cLab_P$. In this case, the second determination portion 153 determines a value obtained by subtracting a colorimetric value difference corresponding to the adjustment target Lab value $Lab_{S2}$ from the adjustment target Lab value $Lab_{S2}$, as the target Lab value TargetLab in the Lab color space CSI.

The second retrieval portion 154 retrieves, as the optimal cmyk value $cmyk_{st}$, the provisional cmyk value $pcmyk_p$ satisfying a condition that the color difference $\Delta E_{00}$ between the provisional Lab value $pLab_p$ in the Lab color space CSI and the target Lab value TargetLab is smaller than the color difference $\Delta E_{00}$ between the adjustment target Lab value $Lab_{S2}$ and the target Lab value TargetLab, the provisional Lab value $pLab_p$ being obtained by converting the provisional cmyk value $pcmyk_p$ in the cmyk color space CSD by using the second printer characteristic A2B table 1276.

A specific method of retrieving the optimal cmyk value $cmyk_{st}$ may employ the same method as the method of retrieving the optimal cmyk value $cmyk_{st}$ in the first embodiment.

FIG. 23 illustrates that the second retrieval portion 154 solves the optimization problem by using the first provisional cmyk value $pcmyk_{p1}$ to the twenty-seventh provisional cmyk value $pcmyk_{p27}$ as initial values. The first provisional cmyk value $pcmyk_{p1}$ may be expressed as a value obtained by adding an initial value $\Delta cmyk_1$ to the adjustment target cmyk value $cmyk_{S2}$. Similarly, the twenty-seventh provisional cmyk value $pcmyk_{p27}$ may be expressed as a value obtained by adding an initial value $\Delta cmyk_{27}$ to the adjustment target cmyk value $cmyk_{S2}$.

A first provisional Lab value $pLab_{p1}$ and a twenty-seventh provisional Lab value $pLab_{p27}$ illustrated in FIG. 23 are values obtained by respectively converting the first provisional cmyk value $pcmyk_{p1}$ and the twenty-seventh provisional cmyk value $pcmyk_{p27}$ by using the second printer characteristic A2B table 1276.

As illustrated in FIG. 23, the second retrieval portion 154 solves the optimization problem by using the first provisional cmyk value $pcmyk_{p1}$, . . . , and the twenty-seventh provisional cmyk value $pcmyk_{p27}$ as initial values, and thus obtains an optimal solution candidate $\Delta cmyk_{pb1}$, . . . , and an optimal solution candidate $\Delta cmyk_{pb27}$. Next, the second retrieval portion 154 specifies an optimal solution $\Delta pcmyk_b$ minimizing the objective function $f(\Delta cmyk_{pbn})$ from among the optimal solution candidate $\Delta cmyk_{pb1}, \ldots,$ and the optimal solution candidate $\Delta cmyk_{pb27}$, and specifies, as the optimal cmyk value $cmyk_{st}$, a value obtained by adding the optimal solution $\Delta pcmyk_b$ to the adjustment target Lab value $Lab_{S2}$. Here, n is a value of 1 to 27.

The second generation portion 155 generates the calibration DLP 127 based on the adjustment target cmyk value $cmyk_{S2}$ and the optimal cmyk value $cmyk_{st}$. For example, the second generation portion 155 stores the adjustment target cmyk value $cmyk_{S2}$ and the optimal cmyk value $cmyk_{st}$ in the calibration DLP 127 in correlation with each other. When only the adjustment target cmyk value $cmyk_{S2}$ is adjusted, grayscale corruption occurs on the periphery of the adjustment target cmyk value $cmyk_{S2}$, and thus the second generation portion 155 adjusts the correction cmyk value cmyk1 for the input cmyk value cmyk0 around the adjustment target cmyk value $cmyk_{S2}$.

FIG. 21 is referred to again. When image information indicating a printing target image output to the second printer 50 is an Lab value or a spot color name, the fourth conversion portion 144 converts the cmyk value obtained through the conversion in the third conversion portion 142 into the correction cmyk value cmyk1 by using the calibration DLP 127. The output control portion 146 causes the second printer 50 to print an image according to the correction cmyk value cmyk1 obtained through the conversion in the fourth conversion portion 144.

In the second embodiment, when the first printer 40 outputs an image, the control device 13a causes the first printer 40 to output the image according to a cmyk value obtained through conversion in the third conversion portion 142 without using the calibration DLP 127 as described in the first embodiment.

Figure 26:
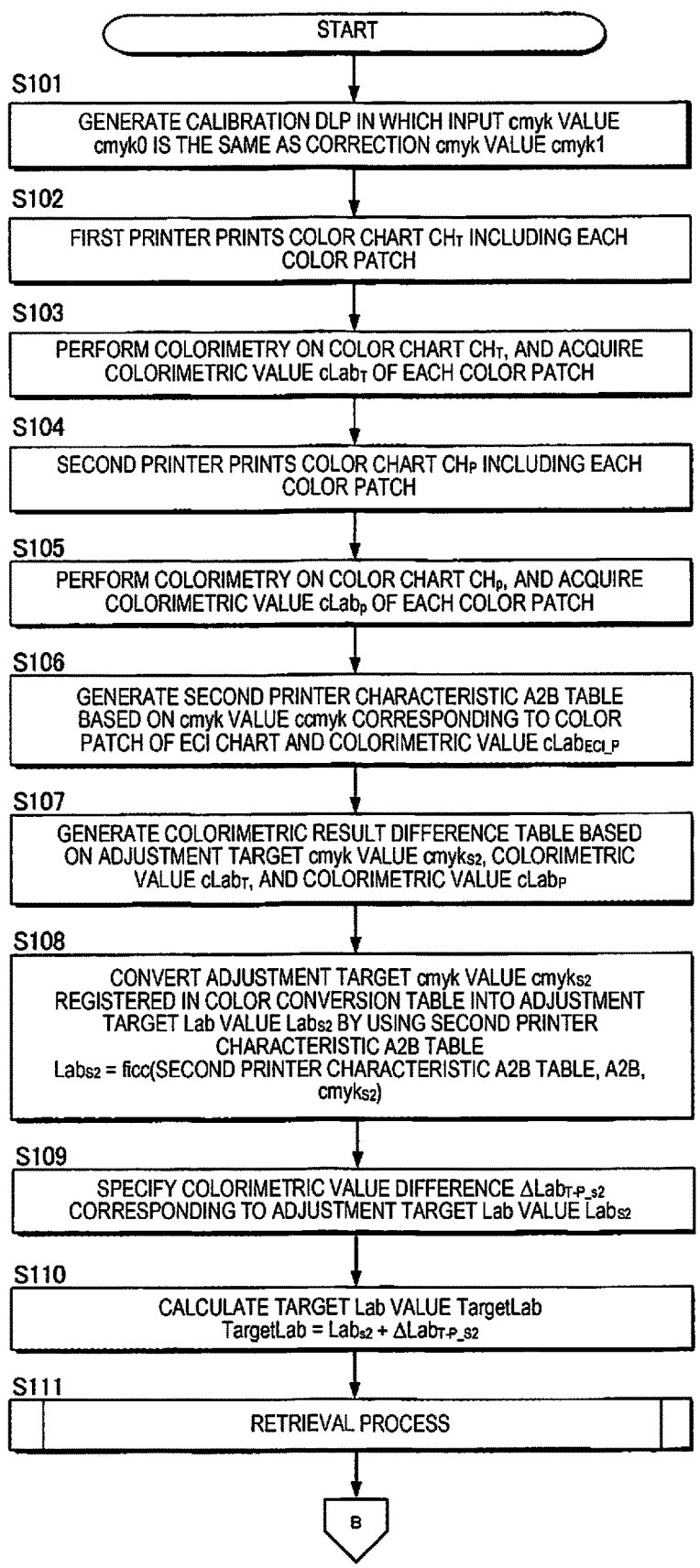
FIG. 26 is a flowchart illustrating a calibration DLP generation process.
Figure 27:
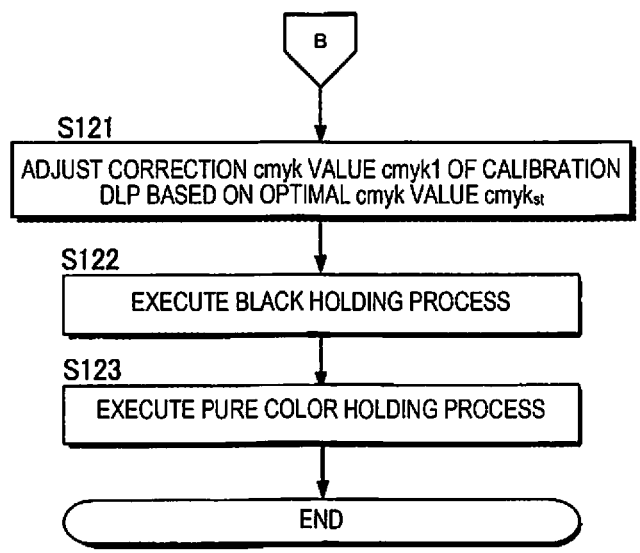
FIG. 27 is a flowchart illustrating the calibration DLP generation process.

B.3. Operation of Color Conversion Table Generation System 1a During Execution of Calibration DLP Generation Process FIGS. 26 and 27 are flowcharts illustrating a calibration DLP generation process. In step S101, the control device 13a generates the calibration DLP 127 in which the input cmyk value cmyk0 is the same as the correction cmyk value cmyk1. Next, in step S102, the control device 13a causes the first printer 40 to print the color chart $CH_T$ including each color patch PA according to the adjustment target cmyk value $cmyk_{S2}$ registered in the color conversion table 126. In step S103, the colorimetry apparatus 30 performs a colorimetry on the color chart $CH_T$ printed by the first printer 40, and the control device 13a acquires the colorimetric value $cLab_T$ of each color patch PA from the colorimetry apparatus 30.

In step S104, the control device 13a causes the second printer 50 to print the color chart $CH_P$ including each color patch PA according to the adjustment target cmyk value $cmyk_{S2}$ registered in the color conversion table 126. In step S105, the colorimetry apparatus 30 performs a colorimetry on the color chart $CH_P$, and the control device 13a acquires the colorimetric value $cLab_P$ of each color patch PA.

Next, in step S106, the control device 13a generates the second printer characteristic A2B table 1276 based on the cmyk value ccmyk corresponding to a color patch of the ECI chart, and the colorimetric value $cLab_{ECI\_P}$ of each color patch printed by the second printer 50 according to the cmyk value ccmyk. As a specific generation method, the control device 13a assigns the cmyk value ccmyk to a cmyk value of the second printer characteristic A2B table 1276. The control device 13a correlates the colorimetric value $cLab_{ECI\_P}$ indicating a colorimetric result of the ECI chart printed by the second printer 50 according to the cmyk value ccmyk, with the assigned cmyk value ccmyk. Specifically, the control device 13a assigns the colorimetric value $cLab_{ECI\_P}$ to an Lab value in the same record as that of the assigned cmyk value ccmyk in the second printer characteristic A2B table 1276.

In step S107, the control device 13a generates the colorimetric result difference table 1274 based on the adjustment target cmyk value $cmyk_{S2}$, the colorimetric value $cLab_T$, and the colorimetric value $cLab_P$. As a specific generation method, the control device 13a assigns the colorimetric value $cLab_P$ indicating a colorimetric result of the color chart $CH_P$ printed by the second printer 50 according to a certain adjustment target cmyk value, to an Lab value of the colorimetric result difference table 1274. The control device 13a calculates the colorimetric value difference $\Delta cLab_{T\_P}$ by subtracting the assigned colorimetric value $cLab_P$ from the colorimetric value $cLab_T$ indicating a colorimetric result of the color chart $CH_T$ printed by the first printer 40 according to the certain cmyk value. The control device 13a correlates the colorimetric value difference $\Delta cLab_{T\_P}$ with the assigned Lab value. Specifically, the control device 13a assigns the colorimetric value difference $\Delta cLab_{T\_P}$ to a $\Delta cLab$ in the same record as that of the assigned Lab value in the colorimetric result difference table 1274.

Next, in step S108, the control device 13a converts the adjustment target cmyk value $cmyk_{S2}$ registered in the color conversion table 126 into the adjustment target Lab value $Lab_{S2}$ by using the second printer characteristic A2B table 1276. The process in step S108 may be described by using the following equation.

$$Lab_{S2} = ficc(\text{second printer characteristic } A2B \text{ table } 1276, A2B, cmyk_{S2})$$

Generation of the calibration DLP 127 is possible even though a plurality of spot colors are registered in the color conversion table 126. However, for simplification of description, in the following description, as an example, a description will be made of a case where a single spot color is registered in the color conversion table 126 unless otherwise mentioned.

In step S109, the control device 13a specifies the colorimetric value difference $\Delta cLab_{T\_P\_S2}$ corresponding to the adjustment target Lab value $Lab_{S2}$ by referring to the colorimetric result difference table 1274.

Next, in step S110, the control device 13a calculates the target Lab value TargetLab by adding the colorimetric value difference $\Delta cLab_{T\_P\_S2}$ to the adjustment target Lab value $Lab_{S2}$. The process in step S110 may be described by using the following equation.

$$TargetLab = Lab_{S2} + \Delta cLab_{T\_P\_S2}$$

Figure 28:
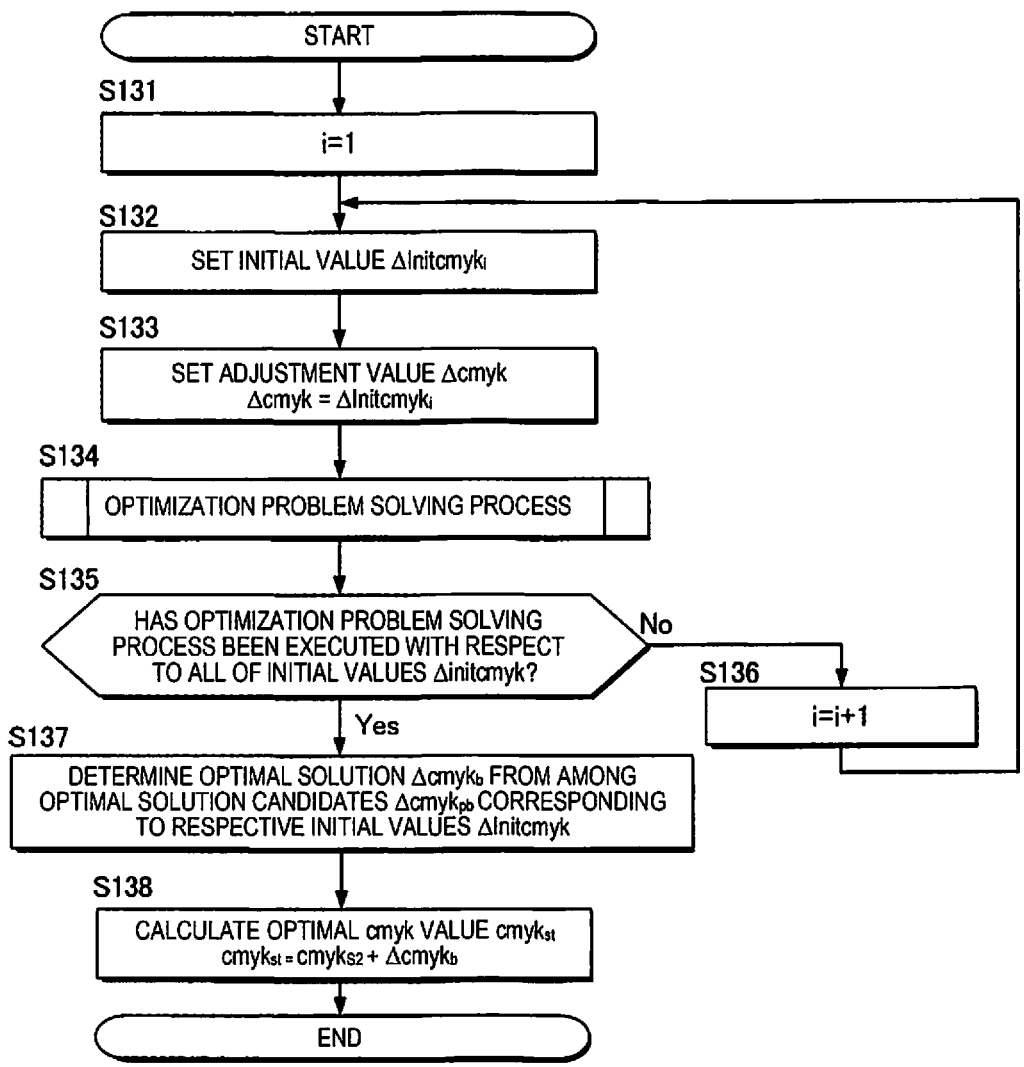
FIG. 28 is a flowchart illustrating a retrieval process in a second embodiment.

In step S111, the control device 13a executes a retrieval process in the second embodiment. With reference to FIG. 28, a description will be made of the retrieval process in the second embodiment.

FIG. 28 is a flowchart illustrating the retrieval process in the second embodiment. The retrieval process in the second embodiment is substantially the same as the retrieval process in the first embodiment. Hereinafter, only a difference from the retrieval process in the first embodiment will be described.

In step S134, the control device 13a executes an optimization problem solving process. The optimization problem solving process will be described with reference to FIG. 29.

Figure 29:
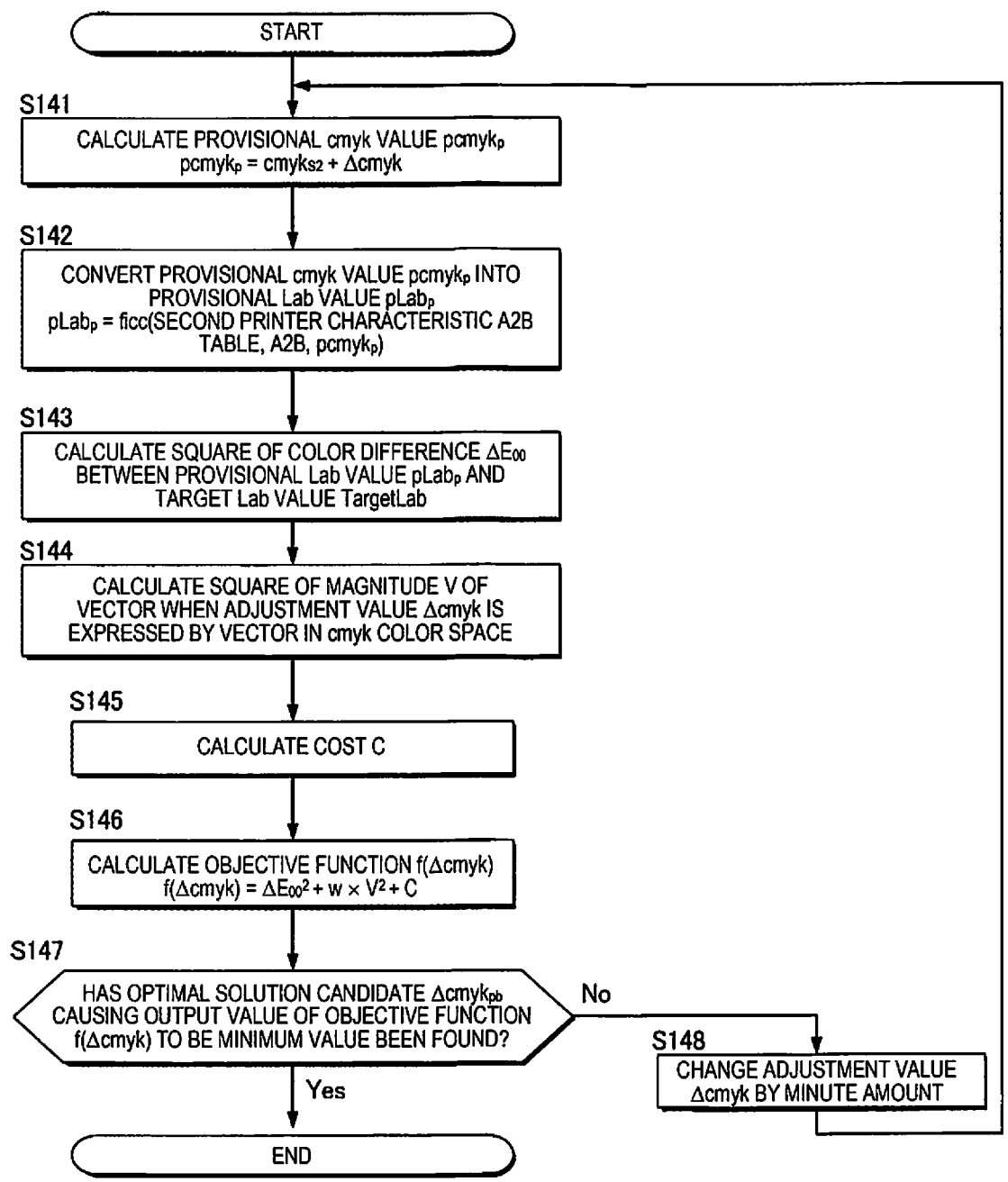
FIG. 29 is a flowchart illustrating an optimization problem solving process in the second embodiment.

FIG. 29 is a flowchart illustrating the optimization problem solving process in the second embodiment. The optimization problem solving process in the second embodiment is substantially the same as the optimization problem solving process in the first embodiment. Hereinafter, only a difference from the optimization problem solving process in the first embodiment will be described.

In step S141, the control device 13a calculates the provisional cmyk value $pcmyk_p$ by adding the adjustment value $\Delta cmyk$ to the adjustment target cmyk value $cmyk_{S2}$. The process in step S141 may be described by using the following equation.

$$pcmykp = cmykS2 + \Delta cmyk$$

In step S142, the control device 13a converts the provisional cmyk value $pcmyk_p$ into the provisional Lab value $pLab_p$ by using the second printer characteristic A2B table 1276. The process in step S142 may be described by using the following equation.

$$pLab_p = ficc(\text{second printer characteristic } A2B \text{ table } 1276, A2B, pcmyk_p)$$

When a determination result in step S147 is affirmative, the control device 13a finishes the series of processes illustrated in FIG. 29, and executes a process in step S135.

FIG. 28 is referred to again. In step S138, the control device 13a calculates the optimal cmyk value $cmyk_{st}$ by adding the optimal solution $\Delta cmyk_b$ to the adjustment target cmyk value $cmyk_{S2}$. The process in step S138 may be described by using the following equation.

$$cmyk_{st} = cmyk_{S2} + \Delta cmyk_b$$

After the process in step S138 is finished, the control device 13a finishes the series of processes illustrated in FIG. 28, and executes a process in step S121 illustrated in FIG. 27.

FIG. 27 is referred to again. In step S121, the control device 13a adjusts the correction cmyk value cmyk1 of the calibration DLP 127 based on the optimal cmyk value $cmyk_{st}$. A specific adjustment method includes the following two aspects.

In a first aspect, the control device 13a sets, as adjustment targets, the correction cmyk values cmyk1 corresponding to the input cmyk values cmyk0 that are sixteen adjacent lattice points as respective vertexes of a multi-dimensional hypercube containing the optimal cmyk value $cmyk_{st}$ among the input cmyk values cmyk0 of the calibration DLP 127. For example, among the sixteen correction cmyk values cmyk1 set as the adjustment targets by the control device 13a, respective components of an i-th correction cmyk value cmyk1 are assumed to be represented by $c1_i$, $m1_i$, $y1_i$, and $k1_i$, and respective components of the optimal cmyk value $cmyk_{st}$ are assumed to be represented by cTarget, mTarget, yTarget, and kTarget. Here, i is an integer of 1 to 16. The control device 13a adjusts the correction cmyk value cmyk1 of the calibration DLP 127 as follows.

$c1_i$=cTarget
$m1_i$=mTarget
$y1_i$=yTarget
$k1_i$=kTarget

In a second aspect, the control device 13a performs adjustment according to the first aspect, then performs a smoothing process such that a smooth change occurs between the respective correction cmyk values cmyk1 of the calibration DLP 127, and adjusts again the correction cmyk values cmyk1 of the calibration DLP 127 based on an optimal solution smoothed through the smoothing process.

The smoothing process is, for example, an interpolation calculation process using a four-dimensional cubic spline function.

In step S122, the control device 13a executes a black holding process. The black holding process is a process of holding a use amount of blank ink in order to suppress a grainy feeling of ink dots. Specifically, in the black holding process, when k0 of the input cmyk value cmyk0 of the calibration DLP 127 is more than 0, k1 of the correction cmyk value cmyk1 is adjusted to be more than 0, and, when k0 is 0, k1 of the correction cmyk value is adjusted to be 0.

Next, in step S123, the control device 13a executes a pure color holding process. The pure color holding process is a process of making the correction cmyk value cmyk1 indicate the same pure color as that of the input cmyk value cmyk0 when the input cmyk value cmyk0 of the calibration DLP 127 indicates cyan, magenta, or yellow. The pure color is a color without ink mixing. As a specific example, when the input cmyk value cmyk0$i$ indicates cyan, $c0_i$ of the input cmyk value $cmyk0_i$ is more than 0, and $m0_i$, $y0_i$, and $k0_i$ thereof are 0. In the pure color holding process, $c1_i$ of the correction cmyk value $cmyk1_i$ is adjusted to be more than 0, and $m1_i$, $y1_i$, and $k0_i$ thereof are adjusted to be 0.

The process in step S123 is finished, and then the control device 13a finishes the series of processes illustrated in FIGS. 26 and 27.

B.4. Operation of Color Conversion Table Generation System 1a During Execution of Printing Process An operation during execution of a printing process in the second embodiment is different from the operation during execution of a printing process in the first embodiment in that the calibration DLP 127 is used when the second printer 50 performs printing in a first color conversion flow, a second color conversion flow, and a third color conversion flow. Therefore, description and illustration of a flowchart illustrating an operation during execution of a printing process in the second embodiment will be omitted, and a description will be hereinafter made of the first color conversion flow, the second color conversion flow, and the third color conversion flow in the second embodiment when the second printer 50 performs printing.

Figure 30:
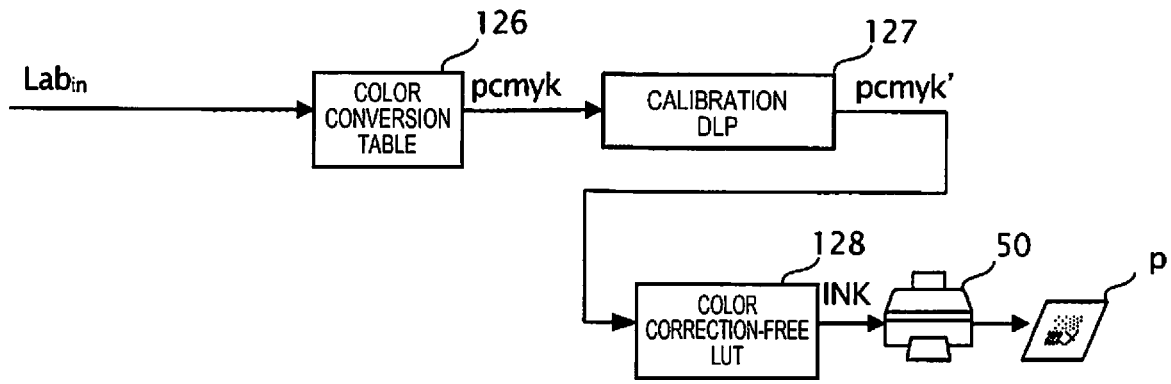
FIG. 30 is a diagram illustrating a first color conversion flow in the second embodiment.

FIG. 30 is a diagram illustrating the first color conversion flow in the second embodiment. In the first color conversion flow, the control device 13a converts an Lab value $Lab_{in}$ as image information into the registration cmyk value pcmyk by using the color conversion table 126. Next, the control device 13a converts the registration cmyk value pcmyk obtained through the conversion into a correction cmyk value pcmyk' corresponding to output characteristics of the second printer 50 by using the calibration DLP 127. The control device 13a converts the correction cmyk value pcmyk' into the ink use amount INK by using the color correction-free LUT 128. Next, the control device 13a causes the second printer 50 to print an image indicated by the Lab value $Lab_{in}$ on the medium p based on the ink use amount INK obtained through the conversion.

Figure 31:
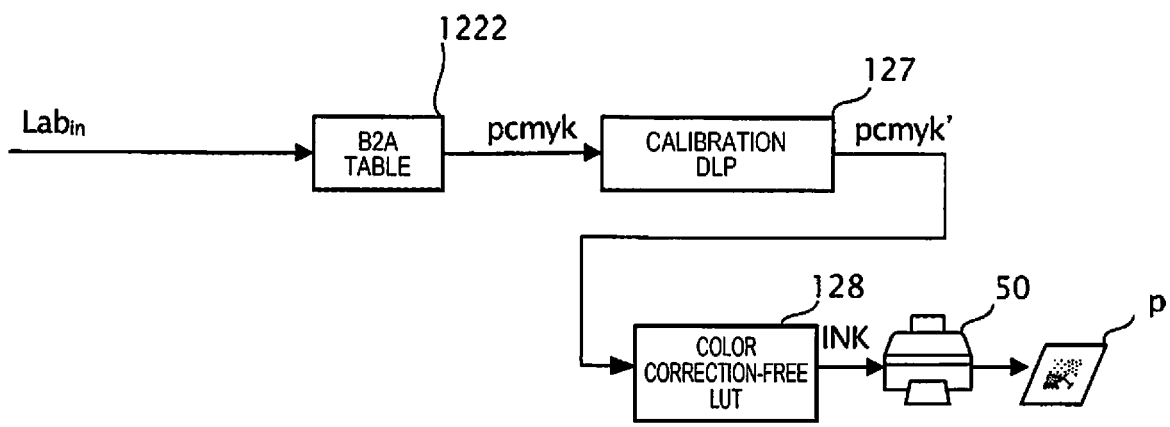
FIG. 31 is a diagram illustrating a second color conversion flow in the second embodiment.

FIG. 31 is a diagram illustrating the second color conversion flow in the second embodiment. In the second color conversion flow, the control device 13a converts the Lab value $Lab_{in}$ as the image information into a cmyk value pcmyk by using the B2A table 1222. Next, the control device 13a converts the cmyk value pcmyk obtained through the conversion into a correction cmyk value pcmyk' corresponding to output characteristics of the second printer 50 by using the calibration DLP 127. The control device 13a converts the correction cmyk value pcmyk' into the ink use amount INK by using the color correction-free LUT 128. The control device 13a causes the second printer 50 to print an image indicated by the Lab value Lab$_{in}$ on the medium p based on the ink use amount INK obtained through the conversion.

Figure 32:
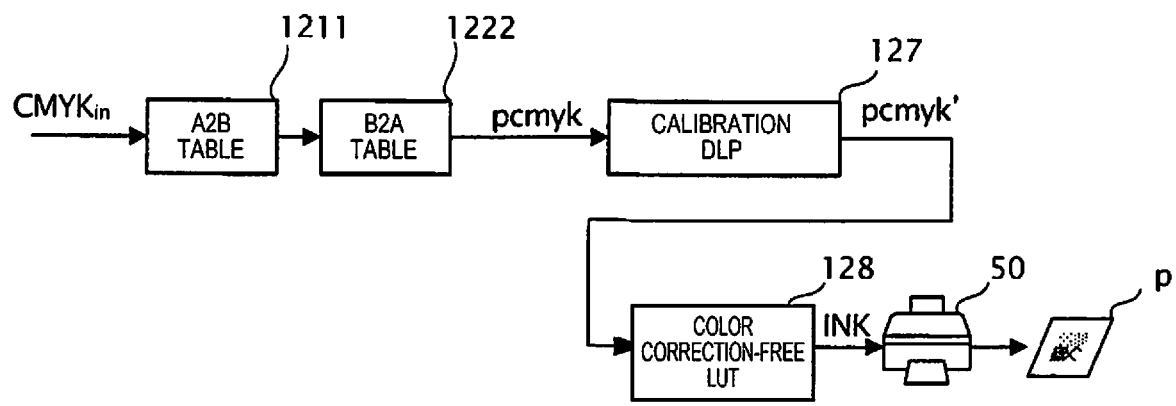
FIG. 32 is a diagram illustrating a third color conversion flow in the second embodiment.

FIG. 32 is a diagram illustrating the third color conversion flow in the second embodiment. In the third color conversion flow, the control device 13a converts a CMYK value CMYK$_{in}$ as the image information into an Lab value by using the A2B table 1211. Next, the control device 13a converts the Lab value obtained through the conversion into the cmyk value pcmyk by using the B2A table 1222. Next, the control device 13a converts the cmyk value pcmyk obtained through the conversion into a correction cmyk value pcmyk' corresponding to output characteristics of the second printer 50 by using the calibration DLP 127. The control device 13a converts the correction cmyk value pcmyk' into the ink use amount INK by using the color correction-free LUT 128. The control device 13a causes the second printer 50 to print an image indicated by the CMYK value CMYK$_{in}$ on the medium p based on the ink use amount INK obtained through the conversion.

B.5. Effects of Second Embodiment

As described above, when image information included in a printing command supplied to the second printer 50 is an Lab value, the fourth conversion portion 144 converts a cmyk value obtained through conversion in the third conversion portion 142 into the correction cmyk value cmyk1 by using the calibration DLP 127, and the output control portion 146 causes the second printer 50 to print an image according to the correction cmyk value cmyk1 obtained through the conversion in the fourth conversion portion 144. The fourth conversion portion 144 functions as a fourth conversion step. The color conversion table 126 may be said to be used in common for the first printer 40 and the second printer 50. As mentioned above, even in the color conversion information generation system having a plurality of printers, the color conversion table 126 is not required to be generated for each printer. Since the second printer 50 prints an image by using the calibration DLP 127, an image corresponding to output characteristics of the second printer 50 is printed. Therefore, even though there is no color conversion table 126 for the second printer 50, when the second printer 50 prints an image with a spot color, it is possible to increase color reproduction accuracy of the spot color.

As illustrated in FIG. 22, since the calibration DLP 127 is a multi-dimensional LUT, it is possible to further increase color reproduction accuracy when a cmyk value obtained through conversion in the third conversion portion 142 indicates colors corresponding to all mixed colors of c, m, y, and k compared with a case of using a one-dimensional LUT.

The control device 13a functions as the fifth conversion portion 151, the specifying portion 152, the second determination portion 153, the second retrieval portion 154, and the second generation portion 155. The fifth conversion portion 151 functions as a fifth conversion step. The specifying portion 152 functions as a specifying step. The second determination portion 153 functions as a second determination step. The second retrieval portion 154 functions as a second retrieval step. The second generation portion 155 functions as a second generation step. The second generation portion 155 generates the calibration DLP 127 indicating a correspondence relationship between the input cmyk value cmyk0, and the correction cmyk value cmyk1 at which a color of an image printed by the second printer 50 according to the input cmyk value cmyk0 is close to a color of an image printed by the first printer 40. During execution of a printing process, the generated calibration DLP 127 is used, and thus it is possible to increase color reproduction accuracy of a spot color when the second printer 50 prints an image with the spot color.

C. Modification Examples

The above-described respective embodiments may be variously modified. Specific modification aspects will be exemplified below. Any two or more aspects selected from the following examples may be combined with each other as appropriate within the scope without contradiction to each other. In the modification examples described below, a constituent element having an operation or a function equivalent to that of the embodiments will be given the same reference sign, and a detailed description of each constituent element will not be repeated as appropriate.

C.1. Modification Example 1

In the first embodiment and the second embodiment, for simplification of description, the input profile 121 and the output profile 122 have only a color conversion table regarding the CMYK color space with respect to an apparatus-dependent color space, but are not limited thereto. For example, the input profile 121 may have an A2B table used to convert an RGB value into an Lab value instead of or in addition to the A2B table 1211. Similarly, the output profile 122 may have a B2A table used to convert an Lab value into an RGB value instead of the B2A table 1222. The output profile 122 may have an A2B table used to convert an RGB value into an Lab value instead of or in addition to the A2B table 1221. The RGB value may take a value of 0 to 255.

Assuming that the input profile 121 has the A2B table 1211 and the A2B table used to convert an RGB value into an Lab value, when the determination result in step S63 is negative, the control device 13 determines whether or not the image information is a CMYK value or an RGB value. When the image information is a CMYK value, the control device 13 converts the CMYK value as the image information into an Lab value by using the A2B table 1211. On the other hand, when the image information is an RGB value, the control device 13 converts the RGB value as the image information into an Lab value by using the A2B table used to convert an RGB value into an Lab value.

When the output profile 122 has the A2B table regarding an RGB value, and the B2A table, the cost C in step S45 and step S145 is a constant adjusted such that a provisional RGB value satisfies a condition that a range that can be taken by each component of the RGB value is 0 to 255. The control device 13 calculates the cost C according to the following equation. In the following equation, respective components of the provisional RGB value are represented by ($R_{pp}$, $C_{pp}$, $B_{pp}$).

$$C = -R_{pp} \times C_{co} \text{ if } R_{pp} < 0$$

$$C = (R_{pp} - 255) \times C_{co} \text{ if } R_{pp} > 255$$

$$C = -G_{pp} \times C_{co} \text{ if } G_{pp} < 0$$

$$C = (G_{pp} - 255) \times C_{co} \text{ if } G_{pp} > 255$$

$$C = -B_{pp} \times C_{co} \text{ if } B_{pp} < 0$$

$C = (B_{pp} - 255) \times C_{co}$ if $B_{pp} > 255$ $C = 0$ if otherwise

The coefficient $C_{co}$ is a positive number, and is preferably about $10^3$ to $10^9$ that is a sufficiently greater number than the range of 0 to 255 that can be taken by each component of an RGB value. When the output profile 122 has the A2B table regarding an RGB value and the B2A table instead of the A2B table 1221 and the B2A table 1222, an RGB color space is an example of a "second color space".

C.2. Modification Example 2

In the second embodiment, when image information included in a printing command supplied to the second printer 50 is an Lab value corresponding to a spot color, the third conversion portion 142 may convert the Lab value into a cmyk value by using the color conversion table 126, and the second printer 50 may output an image according to the cmyk value obtained through the conversion in the third conversion portion 142. In other words, the control device 13a may cause the second printer 50 to output an image without using the calibration DLP 127. For example, when there is no great difference between output characteristics of the first printer 40 and the second printer 50, Modification Example 2 may be employed. Consequently, when there is no great difference between output characteristics of the first printer 40 and the second printer 50, it is possible to increase color reproduction accuracy of a spot color when the second printer 50 prints an image with the spot color.

C.3. Modification Example 3

As described above, the color conversion table 126 may have a spot color name instead of an Lab value. Hereinafter, a description will be made assuming that Modification Example 3 is a modification example of the first embodiment. For example, in step S8, when a spot color name is received instead of the spot color Lab value SP_Lab, in step S57, the control device 13 stores the received spot color name and the registration cmyk value pcmyk in the color conversion table 126.

Figure 33:
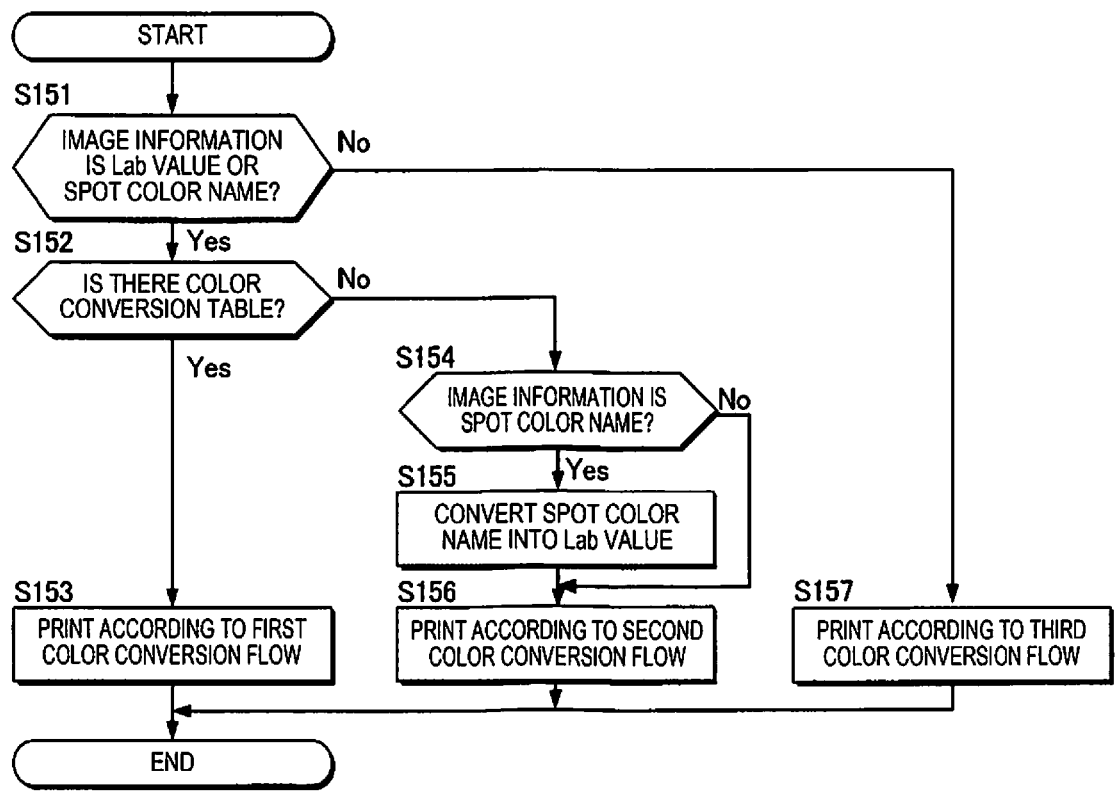
FIG. 33 is a flowchart illustrating an operation when a printing process is executed in Modification Example 3.

FIG. 33 is a flowchart illustrating an operation during execution of a printing process in Modification Example 3. When a printing command supplied to the first printer 40 is received through a user's operation or the like, in step S151, the control device 13 determines whether or not image information included in the printing command is an Lab value or a spot color name. When a determination result in step S151 is affirmative, in step S152, the control device 13 determines whether or not the storage device 12 includes the color conversion table 126. When a determination result in step S152 is affirmative, in step S153, the control device 13 prints an image indicated by the image information according to a first color conversion flow.

Figure 34:
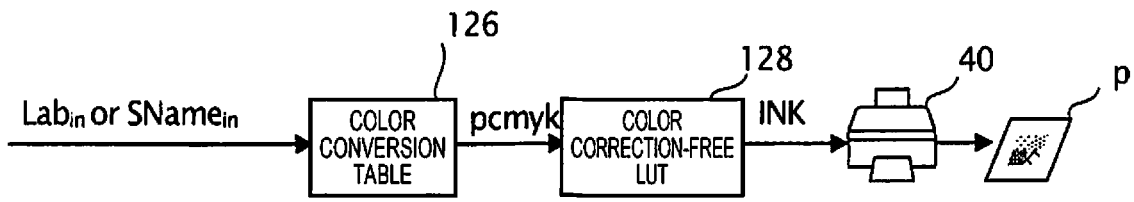
FIG. 34 is a diagram illustrating a first color conversion flow in Modification Example 3.

FIG. 34 is a diagram illustrating the first color conversion flow in Modification Example 3. In the first color conversion flow, when the image information is an Lab value $Lab_{in}$, the control device 13 converts the Lab value $Lab_{in}$ into the registration cmyk value pcmyk by using the color conversion table 126. Alternatively, when the image information is a spot color name $SName_{in}$, the control device 13 converts the spot color name $SName_{in}$ into the registration cmyk value pcmyk by using the color conversion table 126. The subsequent processes are the same as those in the first color conversion flow in the first embodiment, and thus description thereof will not be repeated.

FIG. 33 is referred to again. When the determination result in step S152 is negative, in step S154, the control device 13 determines whether or not the image information is a spot color name. When a determination result in step S154 is affirmative, in step S155, the spot color name is converted into an Lab value by using the color library 124. In step S156, the control device 13 prints an image indicated by the image information according to a second color conversion flow. When the determination result in step S154 is negative, that is, the image information is an Lab value, the control device 13 also executes a process in step S156. The second color conversion flow in Modification Example 3 is the same as the second color conversion flow in the first embodiment, and thus description thereof will not be repeated.

When the determination result in step S151 is negative, that is, the image information is a CMYK value, in step S157, the control device 13 prints an image indicated by the image information according to a third color conversion flow. The third color conversion flow in Modification Example 3 is the same as the third color conversion flow in the first embodiment, and thus description thereof will not be repeated.

The process in step S153, step S156, or step S157 is finished, and then the control device 13 finishes the series of processes illustrated in FIG. 34.

C.4. Other Modification Examples

In the above-described respective embodiments, a spot color has been described to be an example of a "color defined as a first coordinate value", but is not limited thereto. For example, the reception portion 131 may be receive any Lab value instead of a spot color. More specifically, the reception portion 131 may receive a cyan Lab value, a magenta Lab value, a yellow Lab value, or a black Lab value, and may receive any Lab value set by a user instead of a color defined in color sample books such as PANTONE and DIC.

In the above-described respective embodiments, the first printer 40 and the second printer 50 have been described to be ink jet printers, but are not limited thereto. For example, an electrophotographic printer such as a laser printer using toner as a color material, a three-dimensional printer, or a display apparatus may be used. The display apparatus is, for example, a display or a projector.

In the above-described respective embodiments, the objective function f ($\Delta$cmyk) has been described to be expressed by Equation (4), but is not limited thereto. The objective function f($\Delta$cmyk) may be expressed by an equation obtained by excluding the cost C from Equation (4), or an equation obtained by excluding w×V$^2$ therefrom. Equation (4) includes $\Delta E_{00}^2$, but may include $\Delta E_{00}$ instead of $\Delta E_{00}^2$. Similarly, Equation (4) includes w×V$^2$, but may include w×V instead of w×V$^2$.

In the above-described respective embodiments, when a process of generating the calibration DLP 127 is executed, the control device 13a may not execute at least one of step S122 and step S123.

In the above-described respective embodiments, the host apparatus 10 may be understood as a color conversion information generation program causing the host apparatus 10 to function as each unit thereof or a computer readable recording medium recording the color conversion information generation program. The recording medium is, for example, a non-transitory recording medium, and may include not only an optical recording medium such as a CD-ROM but also any well-known recording medium such as a semiconductor recording medium or a magnetic recording medium. In the above-described respective embodiments, a color conversion information generation method according to each of the above-described aspects may be specified.

What is claimed is:

1. A color conversion information generation method of causing a computer to execute:
- a reception step of receiving one or both of a first coordinate value in a first color space for defining a color and a name indicating a color defined as the first coordinate value;
- a first conversion step of converting the first coordinate value into a second coordinate value in a second color space by using first conversion information for converting a coordinate value in the first color space into a coordinate value in the second color space;
- an acquisition step of acquiring a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space;
- a second conversion step of converting the second coordinate value into a third coordinate value in the first color space by using second conversion information for converting a coordinate value in the second color space into a coordinate value in the first color space;
- a determination step of determining a target coordinate value in the first color space based on a color difference between the first coordinate value and the colorimetric coordinate value, and the third coordinate value;
- a retrieval step of retrieving a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and
- a generation step of generating color conversion information for converting the first coordinate value or the name into a coordinate value in the second color space based on the first coordinate value and the fourth coordinate value.

2. The color conversion information generation method according to claim 1, wherein
the retrieval step is a step of
executing a first retrieval process of changing a first adjustment coordinate value such that an output value of an objective function including a color difference between a first conversion coordinate value and the target coordinate value is reduced, the first conversion coordinate value being obtained by converting a first provisional coordinate value by using the second conversion information, the first provisional coordinate value being obtained by adding the first adjustment coordinate value to a certain coordinate value in the second color space,
executing a second retrieval process of changing a second adjustment coordinate value such that an output value of an objective function including a color difference between a second conversion coordinate value and the target coordinate value is reduced, the second conversion coordinate value being obtained by converting a second provisional coordinate value by using the second conversion information, the second provisional coordinate value being obtained by adding the second adjustment coordinate value to the certain coordinate value,
specifying the first provisional coordinate value at the time of finishing of the first retrieval process as the fourth coordinate value when an output value of the objective function at the time of finishing of the first retrieval process is smaller than an output value of the objective function at the time of finishing of the second retrieval process, and
specifying the second provisional coordinate value at the time of finishing of the second retrieval process as the fourth coordinate value when the output value of the objective function at the time of finishing of the second retrieval process is smaller than the output value of the objective function at the time of finishing of the first retrieval process.

3. The color conversion information generation method according to claim 1, wherein
the computer executes a third conversion step of converting image information into a coordinate value in the second color space by using the color conversion information when the image information included in an output command supplied to the first output apparatus is a coordinate value in the first color space or the name, and an output control step of causing the first output apparatus to output an image indicated by the image information according to the coordinate value in the second color space obtained through conversion in the third conversion step.

4. The color conversion information generation method according to claim 3, wherein
in the output control step, when an output command is supplied to a second output apparatus outputting an image corresponding to a coordinate value in the second color space, the second output apparatus outputs an image indicated by image information according to the coordinate value in the second color space obtained through conversion of the image information included in the output command in the third conversion step.

5. The color conversion information generation method according to claim 4, further comprising:
a fourth conversion step of converting the coordinate value in the second color space obtained through conversion in the third conversion step into a correction value by using calibration color conversion information indicating a correspondence relationship between a coordinate value in the second color space and a correction value at which a color of an image output by the second output apparatus according to the coordinate value is close to a color of an image output by the first output apparatus, wherein
in the output control step, the second output apparatus outputs an image indicated by the image information according to the correction value obtained through conversion in the fourth conversion step.

6. A non-transitory computer-readable storage medium storing a program, the program causing a computer to function as:
a reception portion that receives one or both of a first coordinate value in a first color space for defining a color and a name indicating a color defined as the first coordinate value;

a first conversion portion that converts the first coordinate value into a second coordinate value in a second color space by using first conversion information for converting a coordinate value in the first color space into a coordinate value in the second color space;

an acquisition portion that acquires a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space;

a second conversion portion that converts the second coordinate value into a third coordinate value in the first color space by using second conversion information for converting a coordinate value in the second color space into a coordinate value in the first color space;

a determination portion that determines a target coordinate value in the first color space based on a color difference between the first coordinate value and the colorimetric coordinate value, and the third coordinate value;

a retrieval portion that retrieves a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and a generation portion that generates color conversion information for converting the first coordinate value or the name into a coordinate value in the second color space based on the first coordinate value and the fourth coordinate value.

7. A color conversion information generation apparatus comprising:

a reception portion that receives one or both of a first coordinate value in a first color space for defining a color and a name indicating a color defined as the first coordinate value;

a first conversion portion that converts the first coordinate value into a second coordinate value in a second color space by using first conversion information for converting a coordinate value in the first color space into a coordinate value in the second color space;

an acquisition portion that acquires a result of a colorimetry as a colorimetric coordinate value in the first color space, the colorimetry being performed, by a colorimetry apparatus, on an output image that is output by a first output apparatus according to the second coordinate value, the first output apparatus outputting an image corresponding to a coordinate value in the second color space;

a second conversion portion that converts the second coordinate value into a third coordinate value in the first color space by using second conversion information for converting a coordinate value in the second color space into a coordinate value in the first color space;

a determination portion that determines a target coordinate value in the first color space based on a color difference between the first coordinate value and the colorimetric coordinate value, and the third coordinate value;

a retrieval portion that retrieves a fourth coordinate value satisfying a condition that a color difference between a fifth coordinate value in the first color space obtained by converting the fourth coordinate value in the second color space by using the second conversion information and the target coordinate value is smaller than a color difference between the third coordinate value and the target coordinate value; and a generation portion that generates color conversion information for converting the first coordinate value or the name into a coordinate value in the second color space based on the first coordinate value and the fourth coordinate value.

* * * * *